(12) United States Patent
Kaye et al.

(10) Patent No.: US 6,515,659 B1
(45) Date of Patent: Feb. 4, 2003

(54) METHOD AND SYSTEM FOR CREATING REALISTIC SMOOTH THREE-DIMENSIONAL DEPTH CONTOURS FROM TWO-DIMENSIONAL IMAGES

(75) Inventors: Michael C. Kaye, Agoura Hills, CA (US); Charles J. L. Best, Los Angeles, CA (US); Robby R. Haynes, Newbury Park, CA (US)

(73) Assignee: In-Three, Inc., Agoura Hills, CA (US)

( * ) Notice: Subject to any disclaimer, the term of this patent is extended or adjusted under 35 U.S.C. 154(b) by 0 days.

(21) Appl. No.: 10/029,625

(22) Filed: Dec. 19, 2001

Related U.S. Application Data

(63) Continuation-in-part of application No. 09/819,420, filed on Mar. 26, 2001, which is a continuation-in-part of application No. 09/085,746, filed on May 27, 1998, now Pat. No. 6,208,348.

(51) Int. Cl.[7] ............................................. G06T 15/00
(52) U.S. Cl. ..................................................... 345/419
(58) Field of Search ................................ 345/419, 420, 345/426, 619, 620

(56) References Cited

U.S. PATENT DOCUMENTS

| | | | |
|---|---|---|---|
| 3,621,127 A | 11/1971 | Hope | 348/56 |
| 3,737,567 A | 6/1973 | Kratomi | 348/56 |
| 3,851,955 A | 12/1974 | Kent et al. | 352/60 |
| 4,017,166 A | 4/1977 | Kent et al. | 352/57 |
| 4,021,846 A | 5/1977 | Roese | 348/57 |
| 4,168,885 A | 9/1979 | Kent et al. | 352/129 |
| 4,183,633 A | 1/1980 | Kent et al. | 352/60 |
| 4,235,503 A | 11/1980 | Condon | 359/352 |
| 4,436,369 A | 3/1984 | Bukowski | 359/462 |
| 4,544,247 A | 10/1985 | Ohno | 352/62 |
| 4,603,952 A | 8/1986 | Sybenga | 352/65 |
| 5,002,387 A | 3/1991 | Baljet et al. | 352/63 |
| 5,402,191 A | 3/1995 | Dean et al. | 352/63 |
| 5,481,321 A | 1/1996 | Lipton | 352/57 |
| 5,699,444 A | 12/1997 | Palm | 382/106 |
| 5,742,291 A | 4/1998 | Palm | 345/420 |
| 5,748,199 A | 5/1998 | Palm | 345/473 |
| 5,929,859 A | 7/1999 | Meijers | 345/419 |
| 5,973,700 A | 10/1999 | Taylor et al. | 345/427 |
| 6,031,564 A | 2/2000 | Ma et al. | 348/43 |
| 6,088,006 A | 7/2000 | Tabata | 345/7 |
| 6,091,421 A | 7/2000 | Terrasson | 345/419 |
| 6,208,345 B1 * | 3/2001 | Kaye | 345/419 |

FOREIGN PATENT DOCUMENTS

| | | |
|---|---|---|
| WO | WO 97/24000 | 12/1996 |
| WO | WO 99/12127 | 3/1999 |

OTHER PUBLICATIONS

Kaufman, D., "The Big Picture", Apr. 1998, http://www.xenotech.com (downloaded Sep. 8, 1998).

* cited by examiner

*Primary Examiner*—Phu K. Nguyen
(74) *Attorney, Agent, or Firm*—Henricks, Slavin & Holmes LLP

(57) ABSTRACT

An image processing method and system for converting two-dimensional images into realistic reproductions, or recreations of three-dimensional images are embodied in a variety of interactive image processing tools that allow a user to apply any number or combination of image pixel repositioning depth contouring effects, algorithms or the like to create three-dimensional images with smooth realistic appearing surface contours.

42 Claims, 26 Drawing Sheets

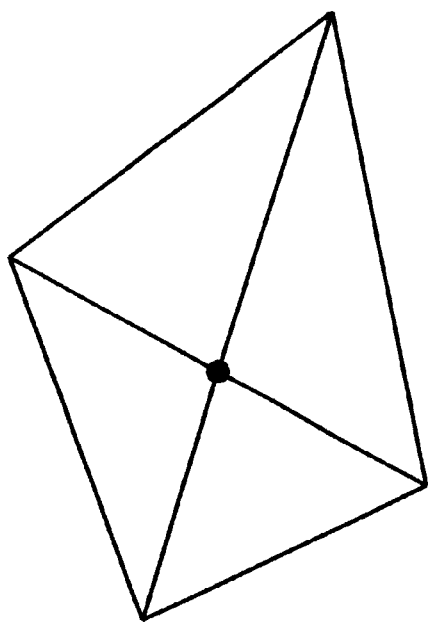
FIG. 11B
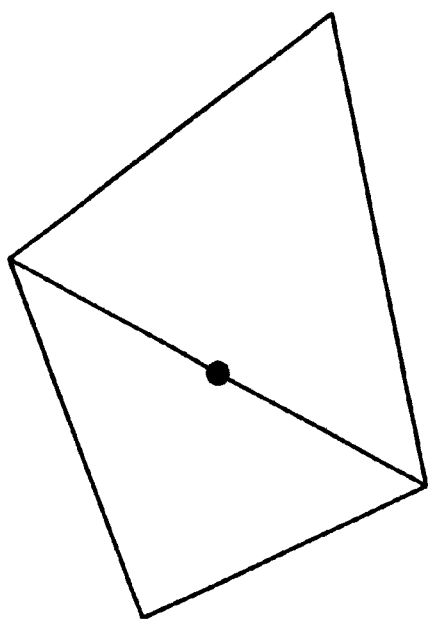
FIG. 11A

Good Appoximation     Bad Appoximation

Edge Swapped

Point Found

After Forced Cross - Contour

Before Forced Cross - Contour

Input contours and points used.

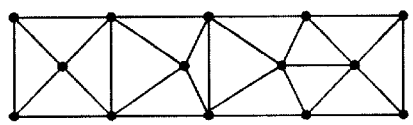

Initial mesh generated with distance minimization and cross-contour forcing. Note that minimization and cross-contour conditions are met, but that the ridge line is distorted.

Side View

Tagged cross-section shape

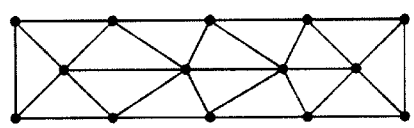

Initial mesh generated after surface smoothing routine has been applied. Note that the ridge line is preserved and that cross-contouring condition is still met even though distance minimization has at some points been overridden for smoothness.

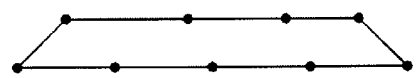

Side View

Regular cross-section shape

FIG. 15

Triangle Refinement Diagram:
Refining a Triangle
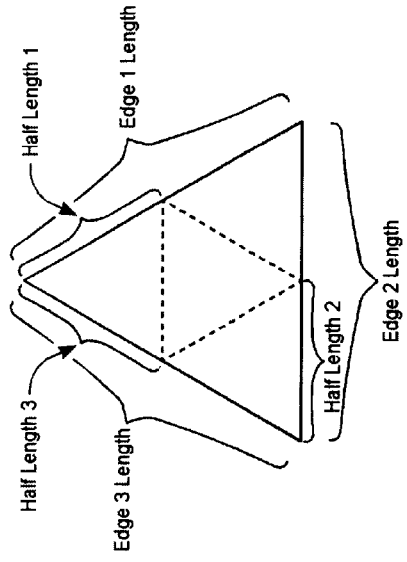
FIG. 17A
Recursive Refinement
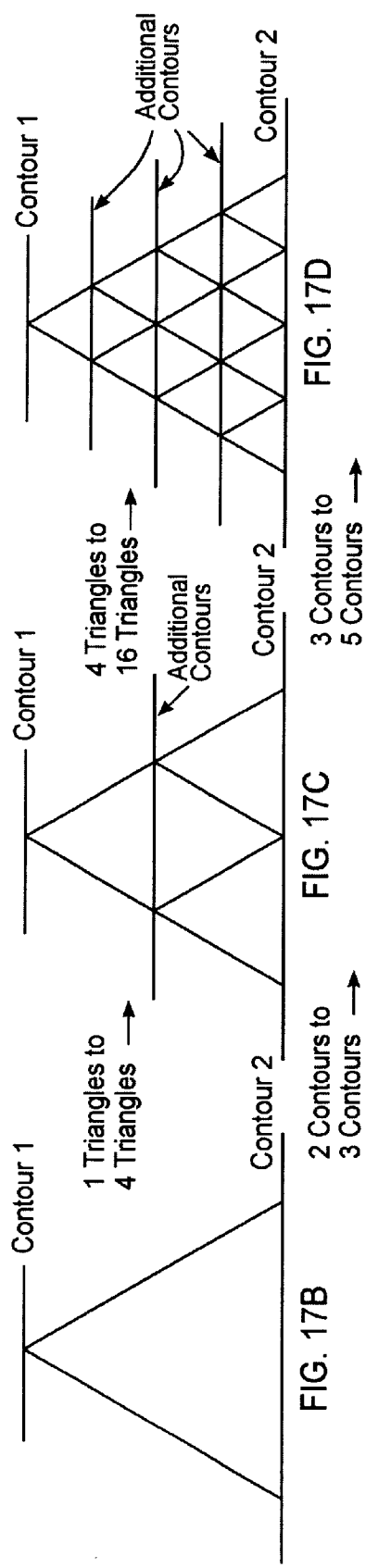
FIG. 17B
FIG. 17C
FIG. 17D

METHOD AND SYSTEM FOR CREATING REALISTIC SMOOTH THREE-DIMENSIONAL DEPTH CONTOURS FROM TWO-DIMENSIONAL IMAGES

CROSS-REFERENCE TO RELATED APPLICATIONS

This application is a continuation-in-part of U.S. patent application Ser. No. 09/819,420 entitled "Image Processing System and Method for Converting Two-Dimensional Images Into Three-Dimensional Images" filed on Mar. 26, 2001, which is a continuation-in-part of U.S. patent application Ser. No. 09/085,746 entitled "System and Method for Converting Two-Dimensional Images into Three-Dimensional Images" filed on May 27, 1998, now U.S. Pat. No. 6,208,348, all of which are incorporated herein by reference in their entirety.

COPYRIGHT NOTICE

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever.

BACKGROUND OF THE INVENTION

1. Field of the Invention

The present invention relates to a method and system for processing two-dimensional images and, more particularly, pertains to a method and system for creating realistic appearing smooth three-dimensional depth contours from two-dimensional images.

2. Description of the Related Art

In order for a three-dimensional image that is rendered from a two-dimensional image to appear realistic it often needs to include many smooth and complex transitions of depth. Unfortunately, known tools within graphic software packages or software filter plug-ins are not specifically designed to convert two-dimensional images into three-dimensional images and, consequently, do not facilitate an accurate true and believable re-creation of a three-dimensional image.

While three-dimensional photography and software for manipulating images (e.g., by simple pixel positioning techniques) are known, portions of the three-dimensional images that they provide often appear as artificial-looking, flat "cardboard cutouts" without smooth rounded depth contour shapes. Typically, the images that they generate appear flat and layered. In other words, objects or subjects appear in these three-dimensional images as flat cardboard cutouts, placed one in front of the other. Presently, the art of converting two-dimensional images into three-dimensional images is devoid of a system or method that would allow for the rapid (fast enough to allow the conversion of hundreds of thousands of frames, as in a motion picture, within a practical time realm) creation of realistic-looking, smooth rounded depth contours of objects within the recreated three-dimensional images.

SUMMARY OF THE INVENTION

According to the present invention, the system and method for converting two-dimensional images into three-dimensional images allow any number or combination of image pixel repositioning depth contouring effects, algorithms or the like (including, but not limited to, smooth linear and non-linear contouring) to be efficiently and rapidly employed to create three-dimensional images with smooth surface contours that appear realistic and not as a layered array of flat "cardboard" type cutouts.

The term Dimensionalize™ process (or Dimensionalizing™ or Dimensionalization™ process) makes reference to and identifies any of the methods for converting standard two-dimensional images into three-dimensional images according to the present invention. The process fundamentally involves employing any combination of software, hardware and/or firmware to process two-dimensional images (e.g., scanned images or captured images in a computer system) and to recreate depth information in the form of complementary perspective frames that were not recorded when the two-dimensional images were originally created, thus facilitating the creation of realistic appearing three-dimensional motion picture images which can be used for viewing directly or projecting.

The Dimensionalize™ process involves actions taken by a person (referred to as a Dimensionalist™) who performs or directs the tasks of evaluating images and defining objects or subjects (e.g., by drawing around the objects or subjects within the images). Through the process, appropriate depth information is associated with the identified objects thereby providing restored, or recreated three-dimensional images that appear as realistic as if the original two-dimensional image had been captured or created in three-dimensions to begin with.

As part of the Dimensionalization™ process, objects are repositioned on the horizontal axis (X-axis) of an image to effectively cause forward or back depth placement. In order to achieve the most accurate and smooth realistic three-dimensional reproduction, the horizontal placement (repositioning) of pixels is performed to a sub-pixel level. Although there is a correlation of depth and dimension to pixel placement, the Dimensionalization™ process—as implemented with present day technology—still needs to be monitored by the Dimensionalist™ to ensure optimal accuracy as there are too many variables affecting depth placement (due to the multitude of possible camera angles within a given scene and image).

Another aspect of the invention relates to objects being partitioned as "sub-objects" for the purpose of applying multiple areas of depth information (e.g., appropriate contouring depth algorithms) to individual objects. Sub-objects may be of any shape or size but are contained completely within the associated full object. Visually, sub-objects are pieces of the full object's surface that may be shaped differently than the general surface of the full object. The depth values of a sub-object and full object match along the boundary of the sub-object so that the Dimensionalized surface defined by a sub-object and its associated full object is defined by a continuous variation of depth. One example of this could be the depth details within a person's face. Each feature within a person's face has certain depth characteristics, such as a person's eyes being somewhat recessed, the nose protruding, etc.

DESCRIPTION OF THE DRAWINGS

Other objects, features and advantages of the invention will become readily apparent upon reference to the following detailed description when considered in conjunction with the accompanying drawings, in which like reference numerals designate like parts throughout the figures thereof, and wherein:

FIGS. 11A and 11B illustrate a step in the process of creating the mesh of the present invention when a point is found on the edge of a triangle of the mesh;

FIG. 15 illustrates an exemplary application of the surface smoothing routine of the present invention;

FIGS. 17A–17D is a diagram showing exemplary triangle refinement steps according to the present invention;

DETAILED DESCRIPTION OF THE PREFERRED EMBODIMENTS

Figure 1:
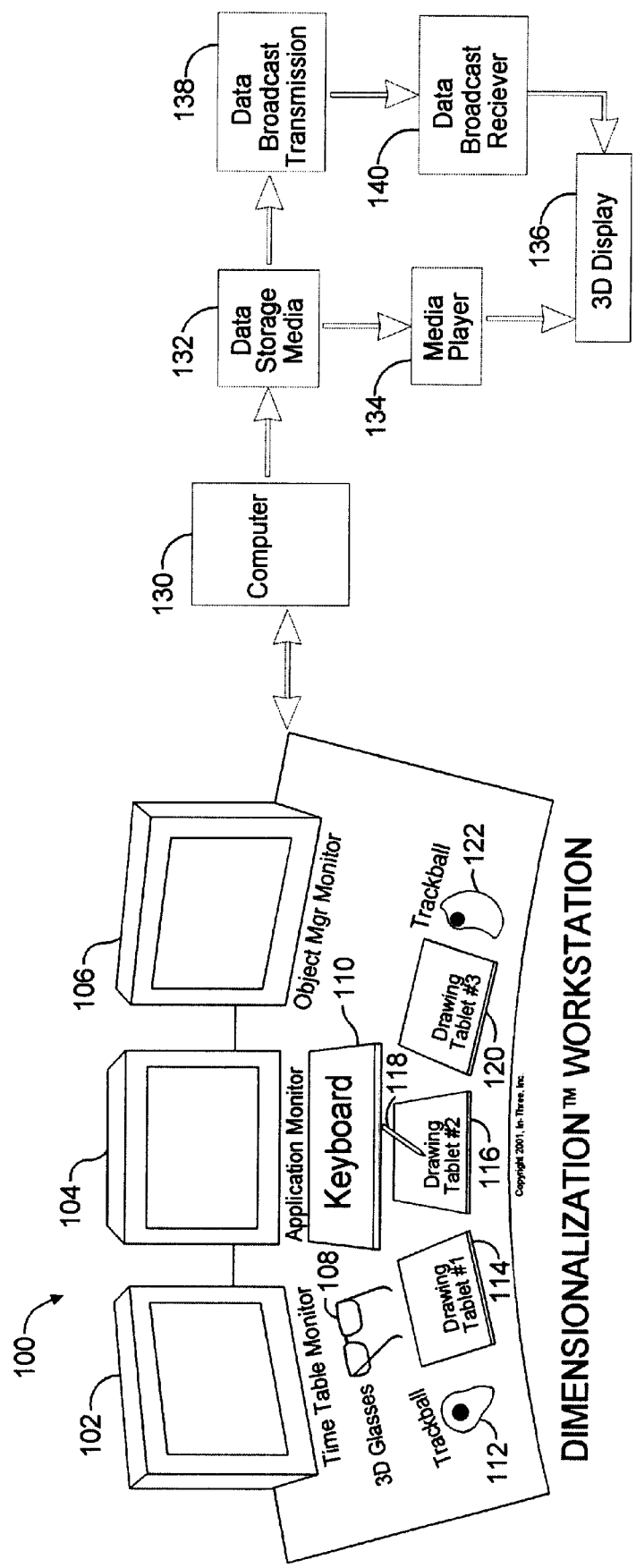
FIG. 1 illustrates an exemplary workstation for implementing the image processing techniques of the present invention.

Referring to FIG. 1, a workstation 100 according to the present invention includes one or more video monitors which provide a user of the Dimensionalization™ process with an interactive interface through which a plurality of original images can be duplicated and rendered into a plurality of complementary images. More specifically, the interactive interface embodies a plurality of tools particularly adapted to facilitate rendering of the complementary images such that each resulting complementary image and its corresponding original image provide a stereo pair of images for a three-dimensional image.

The exemplary workstation 100 shown in FIG. 1 includes a time table monitor 102, an application monitor 104, an object manager monitor 106, three-dimensional glasses 108 and one or more user input mechanisms such as a keyboard 110, trackballs (or mouse) 112, 122, drawing tablets 114, 116, 120 and a drawing pen 118. The workstation also includes a processor/controller 130 which is programmed to provide signals to the monitors 102, 104, 106, control the visual displays at these monitors, and receive and process user inputs provided to the system via the user input mechanisms 110, 112, 114, 116, 118, 120, 122, i.e., control the interactive interface. The processor/controller 130 is also programmed to control the rendering of the complementary images from the original images in response to inputs provided by the user of the workstation. The processor/controller 130 is additionally programmed to provide, in conjunction with the three-dimensional glasses 108 (which synchronize to a signal from the processor/controller), a three-dimensional image at the application monitor 104 which is updated thus allowing the user to observe changes in the depth or placement of various objects within the three-dimensional image. As described below in greater detail, the object manager monitor 106 is employed to display the original images over a number of frames, their objects, and sub-objects. The object manager provides a display allowing the user to maintain organization over a multitude of frames representing time. The processor/controller 130 is programmed to allow the user to select objects within images and to horizontally reposition portions of these objects within the complementary image automatically via a plurality of interactive tools which include object rendering functions.

In addition to controlling the processes within the Dimensionalization workstation, the processor/controller 130 can be used to send the processed data to storage or through various outlets for use. The processed Dimensionalized data can be stored on data storage media 132, which may include solid state memory, magnetic tape, magnetic disc, or optical disc such as compact discs or digital versatile disc (DVD) type removable storage. By storing the Dimensionalized product onto removable media, the data can be reproduced and viewed in a wide variety of ways. For example, DVDs can be used in a media player 134 to play back the Dimensionalized data for three-dimensional (3D) reproduction on a 3D display 136 in a home or professional environment, such as a theatre. The Dimensionalized data can also be broadcast (data broadcast transmission 138) over cable, via the Internet, for example, or be broadcast by electromagnetic transmission such as Satellite or television type transmission. Once the Dimensionalized data is received (data broadcast receiver 140) it can then be used in a wide variety of display applications such as, home entertainment or theatre projection, just to name a few.

It should be understood that the functions implemented by the processor/controller 130 can be performed by one or more processor/controller. Moreover, these functions can be implemented employing a combination of software, hardware and/or firmware taking into consideration the particular requirements, desired performance levels, etc. for a given system or application.

Objects and Contouring

Objects defined in an image may be of any shape or size. According to the present invention, one or more shaping algorithms are employed to give (assign) a screen depth value to each pixel in an object. When multiple algorithms are applied to a single object, the values that each applied algorithm gives a pixel are added together to determine a final screen depth value for the pixel. In a preferred embodiment, application of the algorithms is associative so that algorithms may be applied in any combination and order to shift the object pixels to produce the desired realistic three-dimensional effect. One of the features of this process is the ability to easily apply variable but smooth depth contouring. This provides a much greater level of realism in reconstructing graphical objects in three dimensions.

Rather than simply assigning (to graphical objects in a picture) different depth values that are constant across the entire object, producing an appearance of depth resulting in a flat "cutout" effect, the contouring technique of the present invention allows the user to assign depth values that vary across the surface of the object. This "variable depth values" feature allows arbitrary shaping in the reconstruction of an object's three-dimensional surface and object shaping with much greater depth detail, thereby producing an object with a surface that appears curved and shaped in three dimensions and imparting a high level of realism to the appearance of the final product.

The method and system of the present invention provide, inter alia, means for defining contour paths within an object, either automatically or manually through user inputs. The contour paths define a set of points in the object that initially all lie at the same screen depth and are conceptually analogous to the lines on a topographical map that are associated with discrete geographical altitude information. In a preferred embodiment, a mesh of triangles is generated from these contours. The mesh (further described below) defines a continuous surface that the contours lie on and is used to model the surface of the selected object in the reconstruction of the Dimensionalized object.

According to the present invention, a variety of control functions (software implemented or otherwise) are available to the user for producing a three-dimensional shape that will make a particular object appear as a realistic three-dimensional recreation. If the shape of a spherical bulge is desired, the interactive interface allows the operator, by way of example, to place a point or path within the object where the bulge is to occur. If the operator marks a single point or path, a single bulge will occur. If the operator chooses to select multiple points or paths, multiple bulges will occur around those points. In a preferred embodiment, the operator selects the center to be automatically defined, or, the operator can freehand draw a point or path line anywhere within the object to define the crest, or ridge of the bulge. In a preferred embodiment, by default, the point or path line drawn becomes the most protruding point, or series of points within that object.

Bulges generated by the contour path lines can be convex or concave in screen depth coordinates depending on the amplitude and positive or negative direction (polarity) of the algorithm that the operator applies to each of the independent bulge points or contour path lines. For example, a simple sphere may be created by applying a point to the center of a circular object and defining a circular cross section for the bulge. By applying the appropriate amount of amplitude, a spherical surface is constructed. The sphere will bulge into or out of the screen depending on the positive or negative direction (polarity) of the applied amplitude. If the desired effect is more of a flattened bulge, the operator can adjust either the amplitude or the shape provided by the bulging algorithm, as discussed below with reference to FIGS. 3A–3D. Non-convex surface shaping is also available with adjustments to these parameters.

Figure 1A:
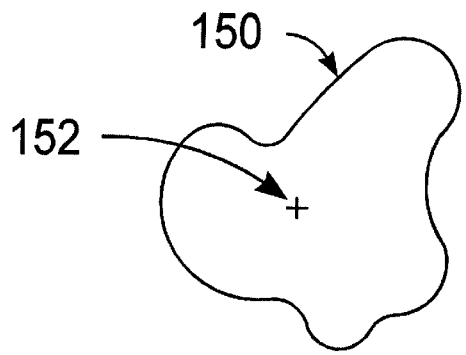
FIGS. 1A–1F illustrate a defined object in an image wherein a single point, multiple points or a contour path line have been drawn to define an upper or lower most point of a depth ridge to be created.
Figure 1B:
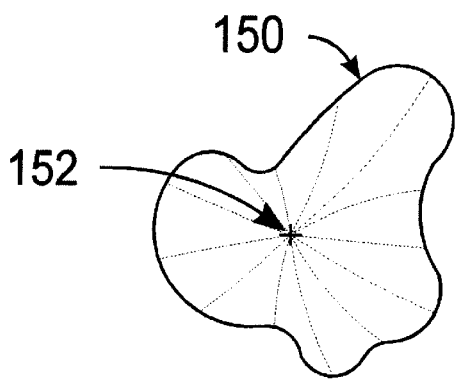
Figure 1C:
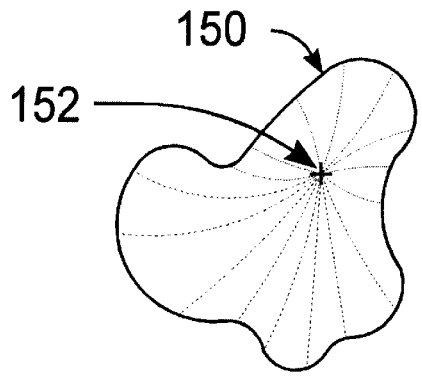

FIGS. 1A–1F illustrate a defined object in an image wherein a single point, multiple points or a contour path line have been drawn to define an upper or lower most point of a depth ridge to be created. In FIG. 1A, a boundary perimeter 150 for a randomly shaped object is shown with a point 152 positioned therein. The point 152 can be user-defined and positioned anywhere within the object, or it can be automatically detected (e.g., centrally positioned) for ease of operation. A bulge, outward or inward, will occur (appear), as shown in FIGS. 1B and 1C, respectively.

Figure 1D:
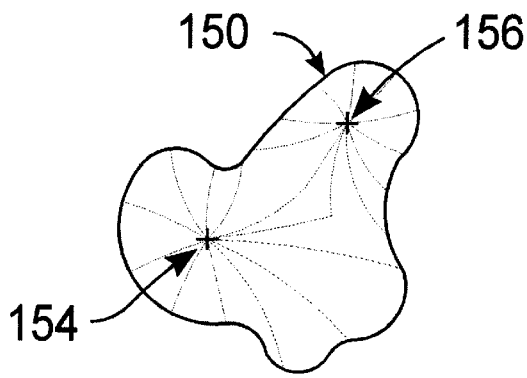

If more than one point is selected, shown in FIG. 1D as points 154 and 156, then multiple contoured bulges will occur. There is no limitation as to how many points can be selected. The amount of bulge, or amplitude, can then be adjusted accordingly to produce the desired and most realistic recreation of depth. In a preferred embodiment, the interactive interface and its software are configured to allow the user to define the depth variation of the straight-line path between any two peaks, such as between the points 154 and 156. This contouring flexibility is important and advantageous, particularly for objects that have many three-dimensional depth variations.

Figure 1E:
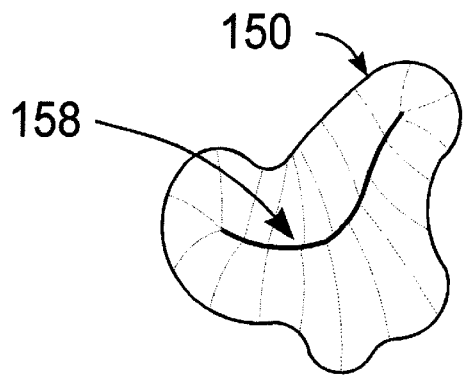
Figure 1F:
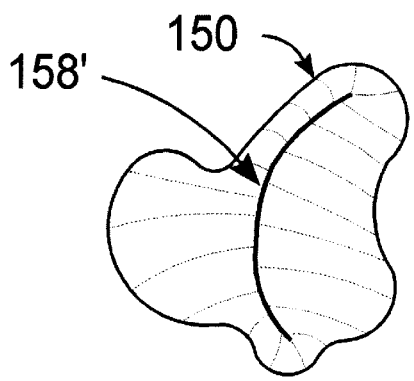

FIG. 1E depicts an example of how a path line 158 (shown as a curve) rather than a point can be applied to an object. The path line 158 can be drawn or defined in any direction (straight or curved), any length, or a plurality of path lines can be applied to the object. In FIG. 1F, the same object is shown with the curve drawn differently as path line 158'. In a preferred embodiment, a drawn curve becomes the upper, or lowest, depending on the desired result, most point of a crest. In FIGS. 1E and 1F, the amplitude of the bulging curve has been applied in the positive direction and the curves 158 and 158' each appear as the outer most point of a ridge protruding toward the viewer. The peak, or ridge of each curve transitions downward toward the boundary perimeter of the object.

An image processing system for converting two-dimensional images into three-dimensional images according to an embodiment of the present invention includes an interactive user interface providing an object drawing tool configured to allow a user of the system to apply one or more straight or curved path lines within a defined object of a two-dimensional image. The interactive user interface is configured to generate from the two-dimensional image a three-dimensional image in which one or more of the path lines appears to the user as a ridge protruding toward or away from the user, the ridge contouring from all points on the path line towards a boundary perimeter of the defined object.

An image processing system for converting two-dimensional images into three-dimensional images according to another embodiment of the present invention includes an interactive user interface configured to allow a user of the system to apply one or more points or straight or curved path lines within a defined object of a two-dimensional image, and to generate a three-dimensional image that shows surface contours between a boundary perimeter of the defined object and the one or more points or straight or curved path lines. In a preferred embodiment, the interactive user interface includes an object drawing tool configured to allow the user to freehand draw the one or more points or straight or curved path lines within a defined object. In a preferred embodiment, the interactive user interface is configured to allow the user to designate a point or path line within the defined object as an upper or lower-most elevation within the three-dimensional image. In a preferred embodiment, the interactive user interface is configured to allow the user to select one or more of the points or path lines and to apply a plurality of three-dimensional shapes about the points or path lines to generate the surface contours. In this embodiment, the interactive user interface is preferably configured to allow the user to apply a plurality of shaping algorithms corresponding to the three-dimensional shapes in any combination and in any order. In a preferred embodiment, the interactive user interface is configured to allow the user to adjust a shape of the surface contours about one or more of the points or path lines while viewing changes made to the surface contours. In a preferred embodiment, the interactive user interface is configured to allow the user to employ a function to adjust a curved shape of the surface contours. In a preferred embodiment, the interactive user interface is configured to allow the user to control variations in perceived depth between any two of the points or path lines. In a preferred embodiment, the interactive user interface is configured to allow the user to change a shape of the surface contours by modifying or repositioning one or more of the points or path lines. In a preferred embodiment, the interactive user interface is configured to allow the user to apply amplitude and/or shape adjustments to the surface contours.

Figure 1G:
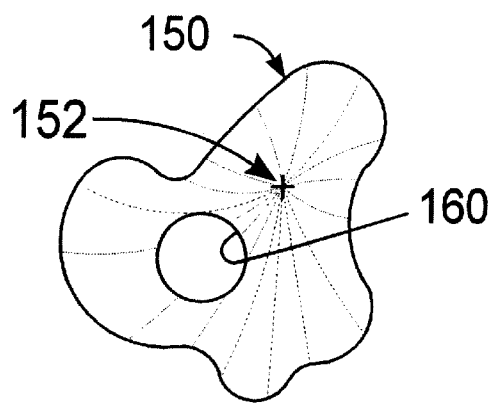
FIGS. 1G–1I illustrate defined objects with one or more holes.
Figure 1H:
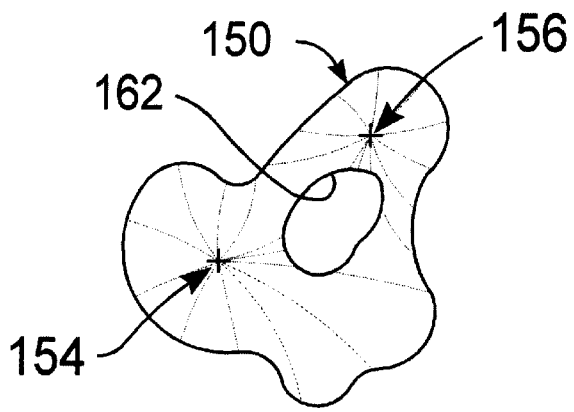
Figure 1I:
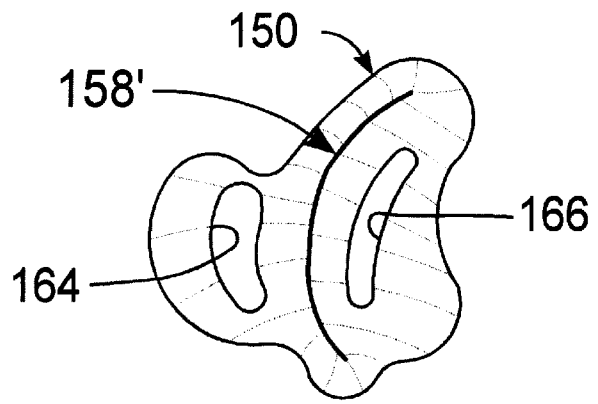

An additional feature of the present invention is that it takes into account holes placed within defined objects. FIG. 1G shows an object with a bulge as in FIG. 1C but including a hole with a boundary 160. Although the bulge occurs across the object, it is not present in the area of the hole. FIG. 1H shows a defined object with two contour bulges as in FIG. 1D but including a hole with a boundary 162. FIG. 1I shows a defined object with a contouring bulge across a path line as in FIG. 1F but including two holes with boundaries 164 and 166, respectively. Thus, according to the present invention, bulges (surface contours) are generated taking into account a hole (or holes) of any shape, size or positioning that may exist within an object. The term "hole" may be interpreted as a cut out type section in the surface of an object, such as a channel through its surface, for example, or as where the cut out hole section boundaries are at the same depth as the perimeter of the object, such as a donut type shape.

An image processing system for converting two-dimensional images into three-dimensional images according to an embodiment of the present invention includes an interactive user interface configured to allow a user of the system to apply one or more points or straight or curved path lines within a defined object of a two-dimensional image, and to generate a three-dimensional image that shows surface contours between a boundary perimeter of the defined object and the one or more points or straight or curved path lines, wherein: the defined object excludes one or more areas within a perimeter boundary of the defined object; and the interactive user interface is configured to generate the three-dimensional image with the surface contours not being applied to the one or more areas such that the one or more areas appear as holes in the defined object allowing any object with its own depth properties to be visible.

Figure 2A:
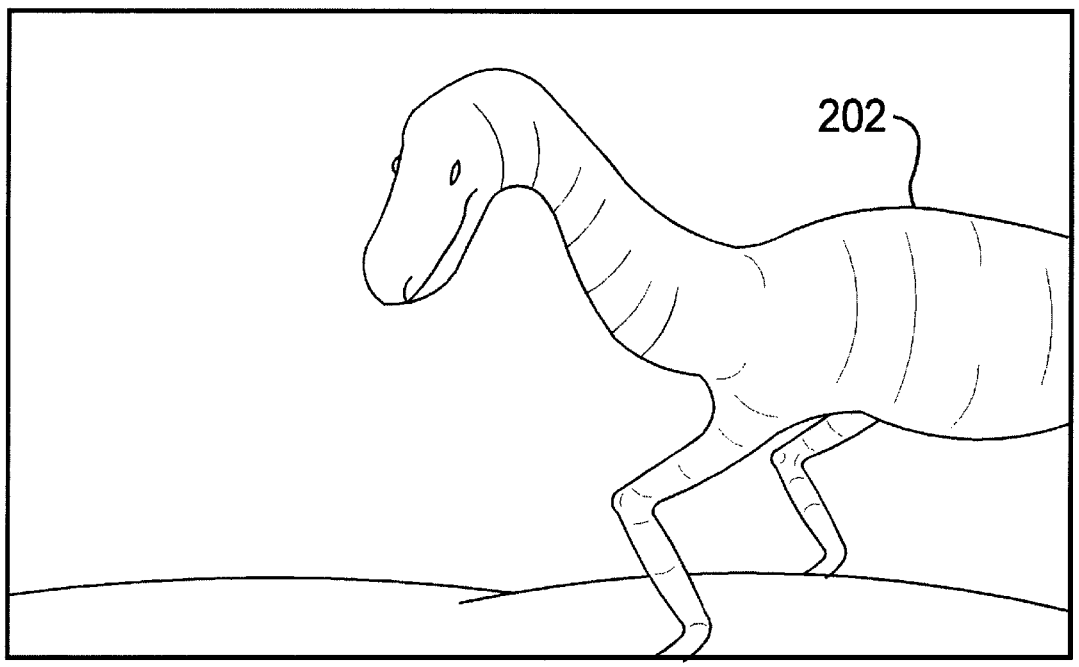
FIGS. 2A and 2B depict an example of how path lines are applied to an image object.
Figure 2B:
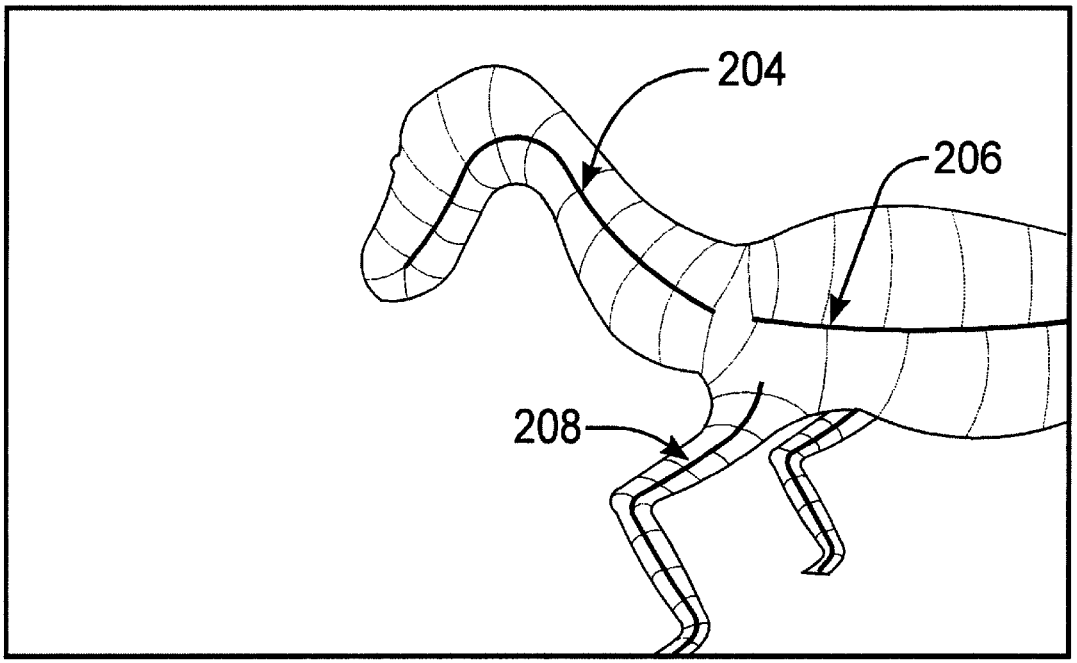

FIG. 2A shows an exemplary image 200 that includes a defined object of a dinosaur with a boundary perimeter 202. Although the object, the dinosaur, may be assigned an overall positional depth, restoring depth contours is additionally important in order for the three-dimensional image to appear natural and realistic. FIG. 2B depicts an example of how, according to the present invention, multiple contour path lines 204, 206 and 208 can be freehand drawn (or otherwise defined) so that each of the path lines becomes the ridge of a curve, the curves protruding toward or away from the viewer. In a preferred embodiment, the amplitude, or amount of bulging across these contour path lines, can be adjusted in real time while viewing the three-dimensional result thus providing a mechanism for rapid verification of the accuracy, realism and general quality of the recreated three-dimensional image.

Figure 3A:
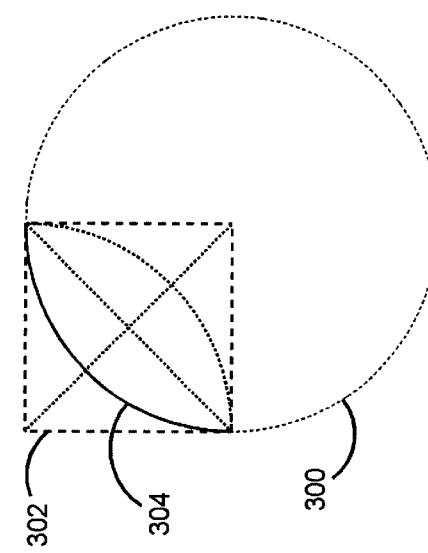
FIGS. 3A–3D conceptually illustrate how the shape of the bulge or surface contours can be controlled or manipulated.
Figure 3B:
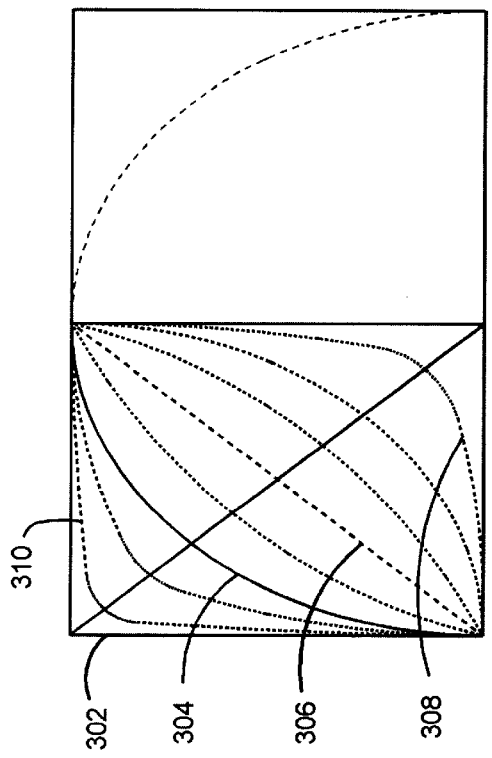
Figure 3C:
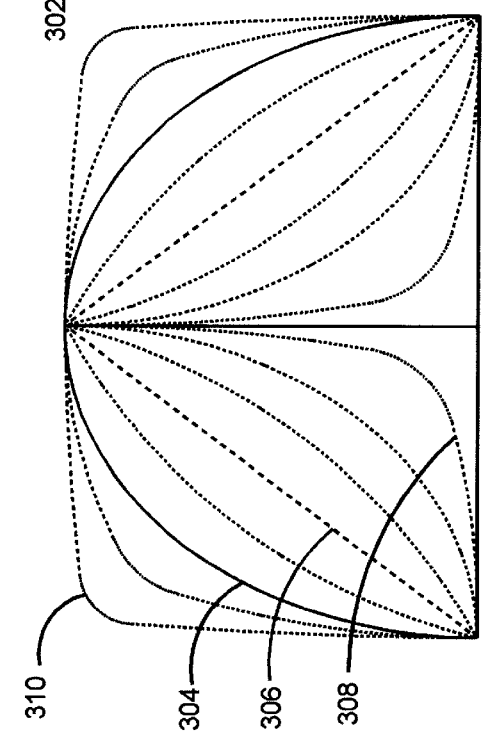
Figure 3D:
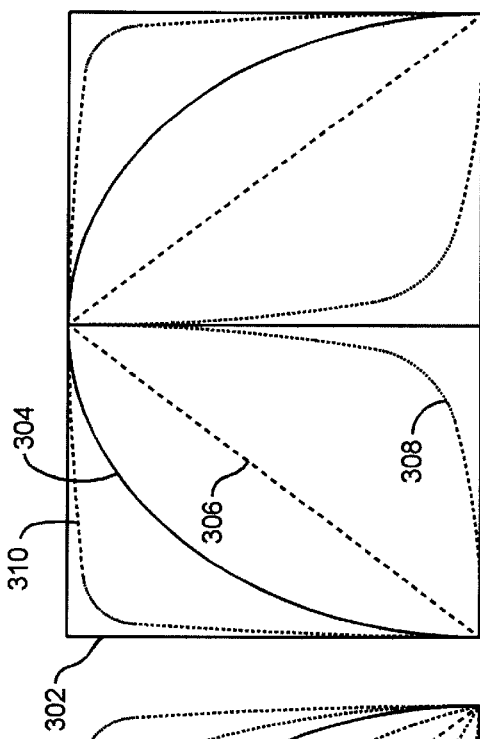

According to the present invention, a variety of interactive tools can be configured and employed to control the shape of the bulge or surface contours. Moreover, the system can, but need not necessarily, provide and/or employ one or more default shapes, e.g., a circle/sphere shape, that can be initially applied to an object. Independent of what shape is initially applied, a key aspect of the present invention is the ability to adjust the cross section of an applied shape to achieve the desired visual effect. FIGS. 3A–3D provide a conceptual example of how the shape of the bulge or surface contours can be controlled or manipulated according to the present invention. For an exemplary bulge or contour algorithm, FIG. 3A depicts a circle 300 with a quarter circle cross-section cutout 302 that includes a default amplitude curve 304. The amplitude of the default bulge (which, by way of example, is circular or parabolic in shape) can be increased or decreased toward or away from the center curve 304 to become a linear shape 306 (flatten), a "minimum" curve 308 (concave or inverse effect), and a "maximum" curve 310 (approaching a square function) with various transitioning curve shape effect possibilities there between. FIG. 3C shows how the curve can transition with one simple adjustment. Although FIGS. 3A–3D demonstrate symmetrically shaped cross sections, it should be appreciated that the scope of the present invention additionally contemplates providing and employing other shape effects, or "families of shapes", including but not limited to shapes with non-symmetrical cross sections. According to the present invention, amplitude and cross section shape manipulations can be combined in any manner desired to achieve different shape effects or different families of surface contour shapes.

In a preferred embodiment, the interactive user interface is configured to allow the user to define and update any cross sectional shape with complete generality—polynomial, rational, intrinsic, or otherwise—once the surface contours and the bulge mesh (discussed below) have been constructed. Additionally, in a preferred embodiment, surface approximation techniques are implemented for providing global control over the shape of a reconstructed surface of an object once an initial surface has been constructed.

Figure 4A:
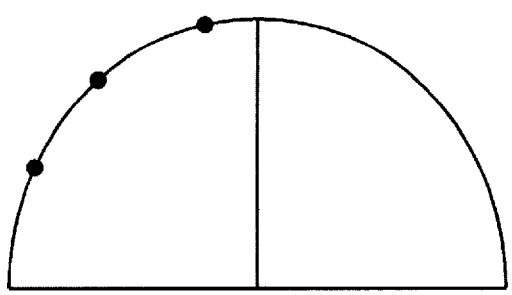
FIG. 4A provides an example of how points can be placed on a spherically shaped graphical interface curve tool of the present invention.
Figure 4B:
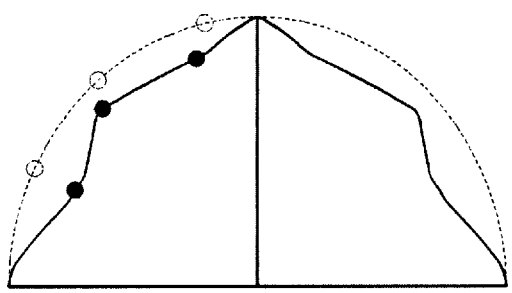
FIGS. 4B and 4C provide examples of how the points in FIG. 4A can be used to pull or stretch the default circle into different curve shapes.
Figure 4C:
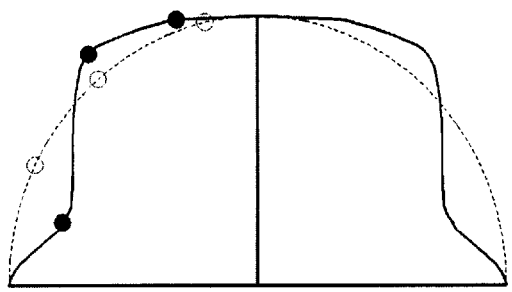
Figure 4D:
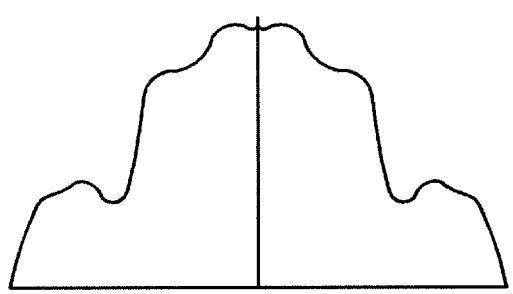
FIG. 4D provides an example of how a desired curve shape can be freehand drawn employing an exemplary graphical user interface of the present invention.

An exemplary preferred graphical user interface according to the present invention is configured to provide great flexibility by allowing the user to input or modify the shape of a bulge or surface contours in many different ways. One method for modifying a shape employs a graphical user interface configured to allow the user to place points anywhere along a working curve, as represented in FIG. 4A. In this example, three points are shown positioned along a default circle shape. The points were placed as shown by a user employing, for example, a tablet pen of the interactive user interface. FIGS. 4B and 4C provide two examples of how, according to the present invention, the points can be used to pull or stretch the default circle into different curve shapes. In a preferred embodiment, the resulting curve can be applied to the shape of the bulge when either positive or negative amplitude is applied. FIG. 4D illustrates how another method modifying a shape employs a graphical user interface configured to allow the user to freehand draw any curve shape with a pen tablet or similar user input mechanism. In a preferred embodiment, the curves are shown as symmetrical (as in FIGS. 4A–4D) for better visualization, but the user need only adjust one half of the curve to create the symmetrical effect.

Figure 5A:
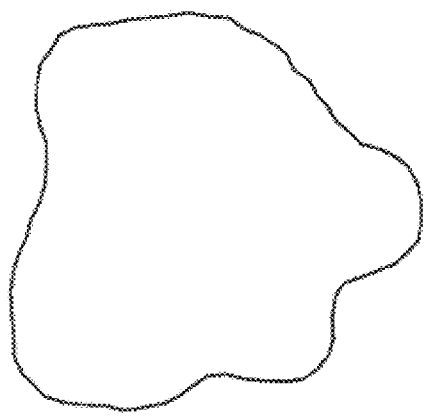
FIG. 5A shows a boundary perimeter of an exemplary defined object.
Figure 5B:
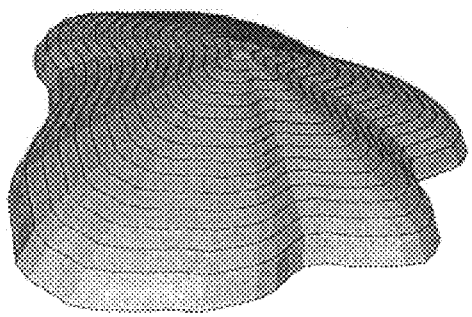
FIG. 5B depicts an example of a three-coordinate graph representing a spherical bulge shape applied to the object of FIG. 5A.
Figure 5C:
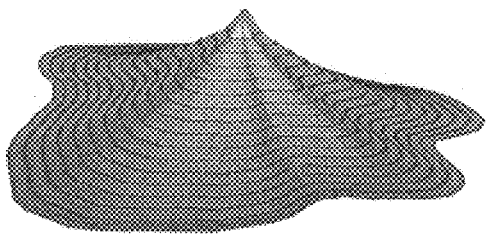
FIG. 5C depicts an example of a three-coordinate graph representing an inverse spherical bulge shape applied to the object of FIG. 5A.
Figure 5D:
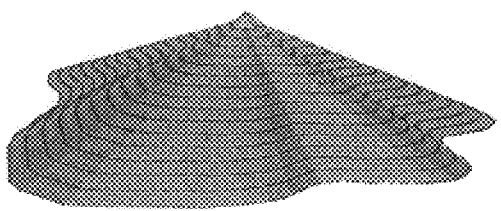
FIG. 5D depicts an example of a three-coordinate graph representing a linear conal shape function applied to the object of FIG. 5A.
Figure 5E:
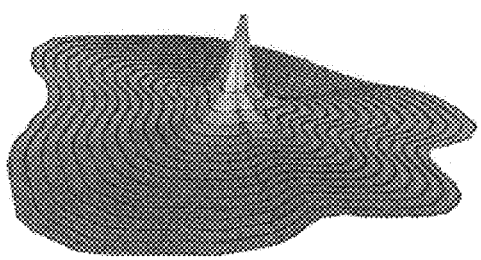
FIG. 5E depicts an example of a three-coordinate graph representing an elliptically shaped function applied to the object of FIG. 5A.
Figure 5F:
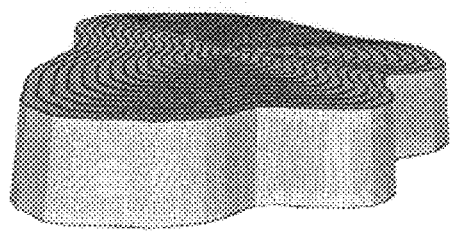
FIG. 5F depicts an example of a three-coordinate graph representing a squared shape function applied to the object of FIG. 5A.

In a preferred embodiment, the interactive user interface is configured to generate a three-coordinate graph representing the three-dimensional shape of the object being adjusted. This graphical representation helps the user visualize the object shape, contour, and amplitude. FIGS. 5A–5F demonstrate examples of how three-dimensional visual representations of surface contours are provided to the user according to the present invention. Referring to FIG. 5A, a boundary perimeter of an exemplary defined object is shown. FIG. 5B depicts an example of a three-coordinate graph representing a bulge shape applied to the object of FIG. 5A. In this example, the user has defined a single point as the peak of the bulge. As the user adjusts the squaring function applied to the object, the three coordinate graph serves as a good indicator of the actual shape of the contour bulge shape being adjusted. FIG. 5C depicts an example of a three-coordinate graph representing an inverse spherical bulge shape applied to the object of FIG. 5A. In this example, the user has adjusted the shape toward the inverse of the sphere. FIG. 5D depicts an example of a three-coordinate graph representing a linear pyramidal shape function applied to the object of FIG. 5A. In this example, the user has selected a linear function employing the interactive user interface. FIGS. 5E and 5F are further examples of the varying shapes that the user may apply to the object according to the present invention. FIG. 5E depicts an example of a three-coordinate graph representing an elliptically shaped function applied to the object of FIG. 5A. FIG. 5F depicts an example of a three-coordinate graph representing a squared shape function applied to the object of FIG. 5A. It should be appreciated that shape functions other than those explicitly described herein can also be employed according to principles of the present invention. Moreover, in a preferred embodiment, the interactive user interface is configured to allow the user to rotate the generated graphs (or any other visual representations of surface contours). For example, the interactive user interface is configured to generate an image of an object with applied surface contours that rotates about a selected axis at a slow (or other) speed appropriate for viewing the rotating image.

Figure 6A:
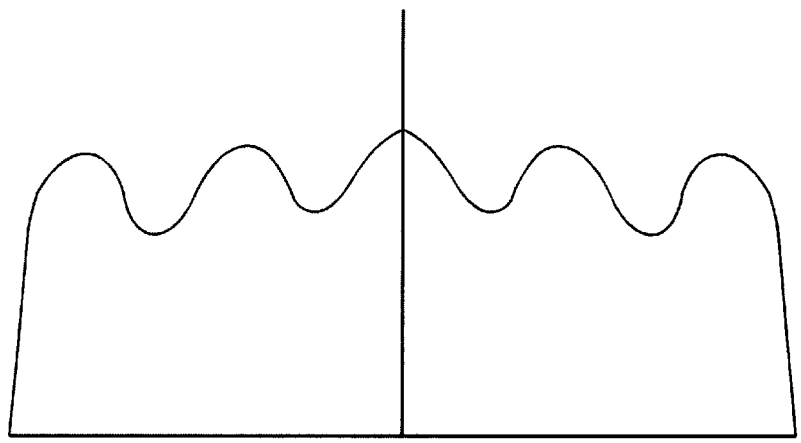
FIG. 6A is curve representing wave shapes provided by an exemplary wave (or ripple) algorithm.
Figure 6B:
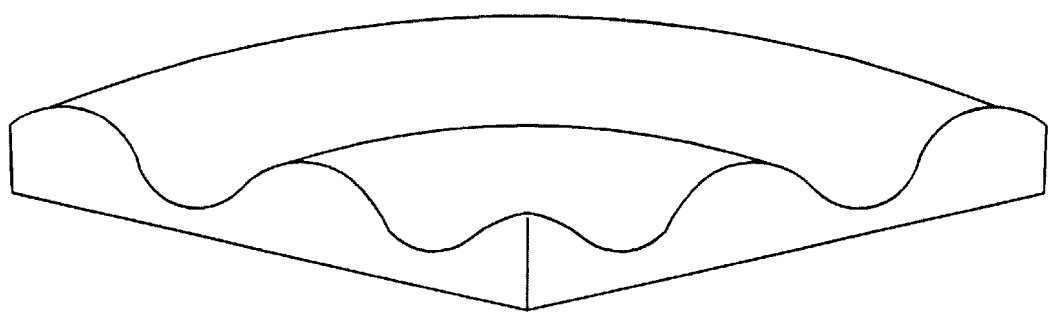
FIG. 6B is a perspective, partial cross sectional view of an object that has had the algorithm of FIG. 6A applied to it.

FIG. 6A is curve representing wave shapes provided by an exemplary wave (or ripple) algorithm. FIG. 6B is a perspective, partial cross sectional view of an object that has had the algorithm of FIG. 6A applied to it to provide the appropriate depth appearance for this type of object. The peaks and valleys of the curve (FIG. 6A) respectively correspond to the high and low crests of the object (FIG. 6B) and can be applied to the image as one algorithm.

According to the present invention, any contour shape needed to provide a realistic appearing image can be generated without limitation. To this end, an exemplary preferred system and method according to the present invention facilitate application of a plurality of shaping algorithms to each object in any combination and in any order.

Figure 7A:
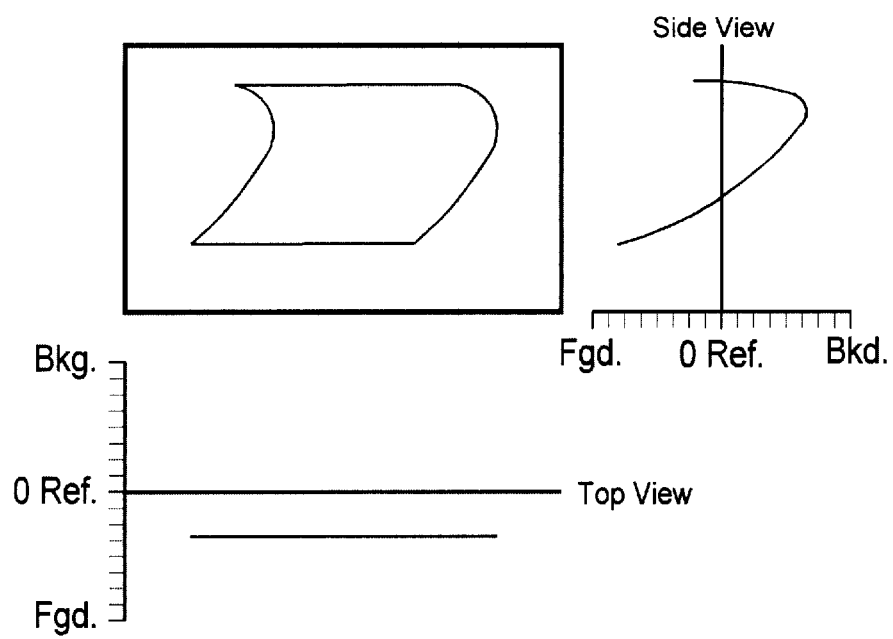
FIGS. 7A and 7B show exemplary graphical user display tools that additionally include top and side peripheral views to help visualize object and depth placement.
Figure 7B:
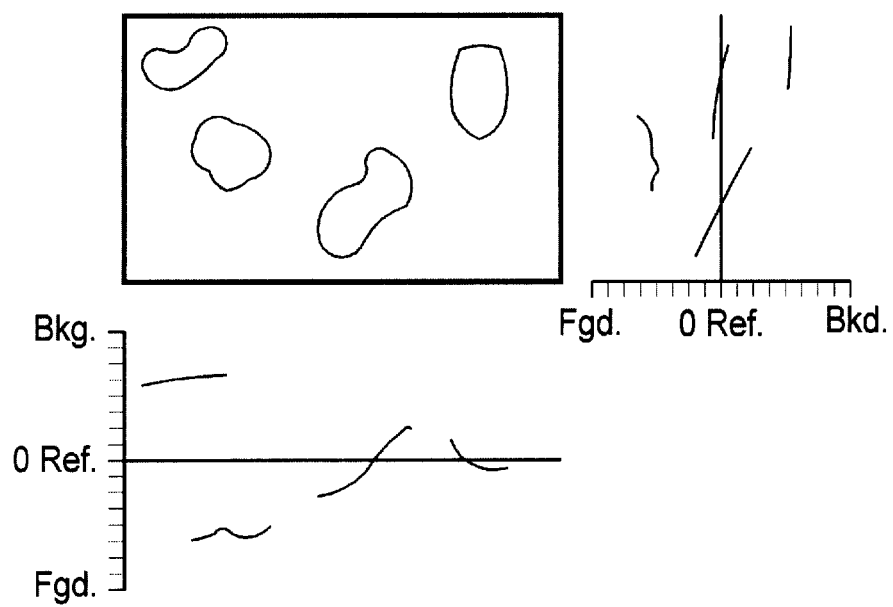

According to the present invention, still other graphical tools can be provided as part of the interactive user interface to assist the user in visualizing, at a glance, basic depth positions of objects. FIGS. 7A and 7B provide two examples of a graphical tool that includes a primary image graphic and one or more peripheral graphics. In the illustrated examples, the peripheral graphics comprise top and side views of path lines that have been applied to the objects shown in the primary image graphic. Alternatively, the peripheral graphics can provide complete top and side views of the objects, with or without path lines, points, etc. shown. It should also be understood that the peripheral graphics are not limited to top and side views and that other views (e.g., bottom, perspective) can additionally or alternatively be provided.

In FIG. 7A, an image of an ocean wave is displayed as the primary image graphic, and top and side views of the path lines applied to the wave object are displayed as the peripheral graphics. The peripheral graphic positioned below the primary image graphic is the "Top View", as if one were looking down at the screen. The peripheral graphic positioned to the right of the primary image graphic is the "Side View", as is one were looking sideways at the screen. As can be seen in FIG. 7B, the afore-described graphic tools also allow the user to visualize depth and relationships between a plurality of objects present in an image by providing a graphical display of the multiple objects. Although the illustrated graphical display tools are helpful in visualizing object placement and depth values at a glance, preferably the user primarily relies upon viewing the actual three-dimensional result of the entire image.

An image processing method for converting two-dimensional images into three-dimensional images according to an embodiment of the present invention includes the steps of: applying one or more straight or curved path lines within a defined object of a two-dimensional image; associating surface contours of a three-dimensional shape with the path lines; and generating a graphical representation of the surface contours along the path lines. In a preferred embodiment, the step of generating a graphical representation comprises rotating the graphical representation to correspond to a different perspective view of the surface contours.

Figure 1K:
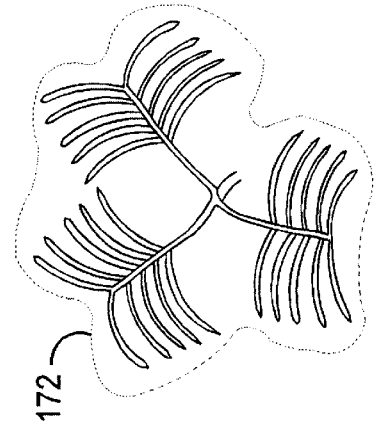
FIGS. 1J–1O demonstrate examples of how a defined object in an image can be captured and how a Virtual Object feature of the present invention can be employed to contour the captured object.
Figure 1L:
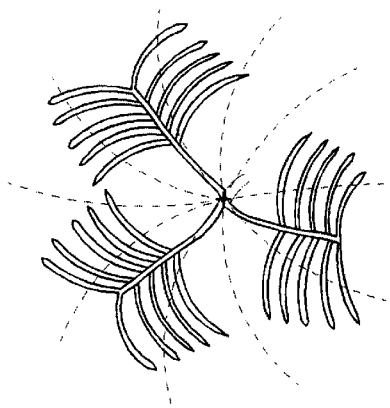
Figure 1J:
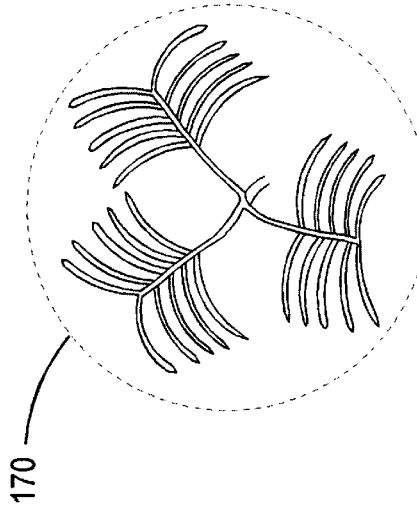
Figure 1O:
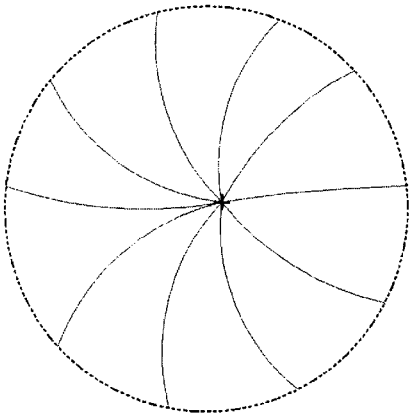
Figure 1M:
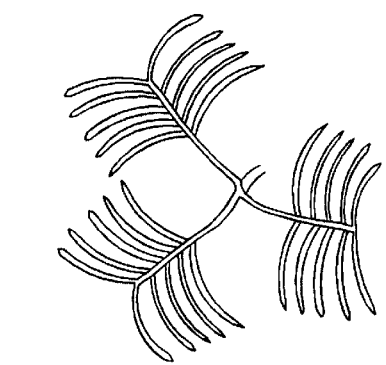
Figure 1N:
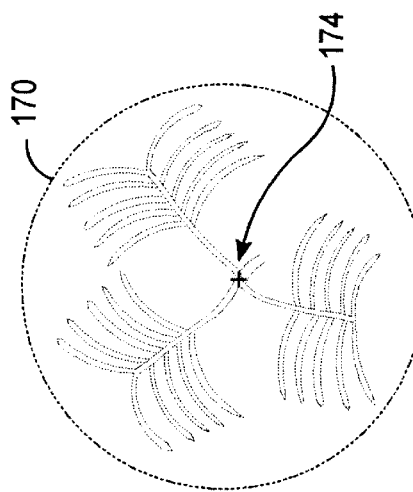

An exemplary interactive user interface according to the present invention is configured to provide the user with a mechanism for quickly "capturing" image objects (or portions of objects) and applying surface contours to the captured object or object portion. This is particularly useful when the defined object to be captured is intricate or complex, such as the plant shown in FIG. 1J. In this example, in order for the perceived depth of the plant to appear correctly, the entire plant with all of its branches and leaves should smoothly contour inward toward the center where the three branches join. FIGS. 1K and 1L provide examples of how the defined object for the plant can be captured employing the interactive user interface. Preferably, the interactive user interface is configured to provide the user with flexible and versatile tools for capturing defined objects or portions of defined objects. These tools can include, for example, any combination of fully-automated, semi-automated or manual drawing tools. In FIG. 1K, a circle boundary 170 is shown. In this example, the interactive user interface is configured such that the system software, in response to inputs provided by the user, generates, resizes and repositions the circle boundary 170 within the image until the user accepts the drawn boundary and initiates the afore-described capture function. In FIG. 1L, a freehand drawn boundary 172 is shown. In either case, for this plant example, a center point is then applied to the captured object. As shown in FIG. 1M, a center point 174 has been applied at a position in the plant object where the three branches meet. FIG. 1N illustrates a Virtual Bulge that will be applied to the captured object with reference to the circle boundary 170 and the center point 174. The Virtual Bulge is applied within the boundary perimeter of the captured object or object portion resulting in the entire complexity of the captured object being contoured, as shown in FIG. 1O, consistent with the shape (bulge) dictated by the algorithm(s) defining the Virtual Bulge. This feature of the present invention permits a vast increase in three-dimensional image recreating speed and flexibility—in this example, by facilitating rapid capture of the entire plant and application of an inward contouring bulge of a chosen direction and algorithm shape to the captured object.

An image processing system for converting two-dimensional images into three-dimensional images according to an embodiment of the present invention includes an interactive user interface configured to allow a user of the system to apply one or more points or straight or curved path lines within a defined object of a two-dimensional image, and to generate a three-dimensional image that shows surface contours between a boundary perimeter of the defined object and the one or more points or straight or curved path lines, wherein the interactive user interface is configured to allow the user of the system to capture any portion or the entirety of a defined object of the two-dimensional image and to apply the surface contours to the captured portion of the defined object.

Figure 1Q:
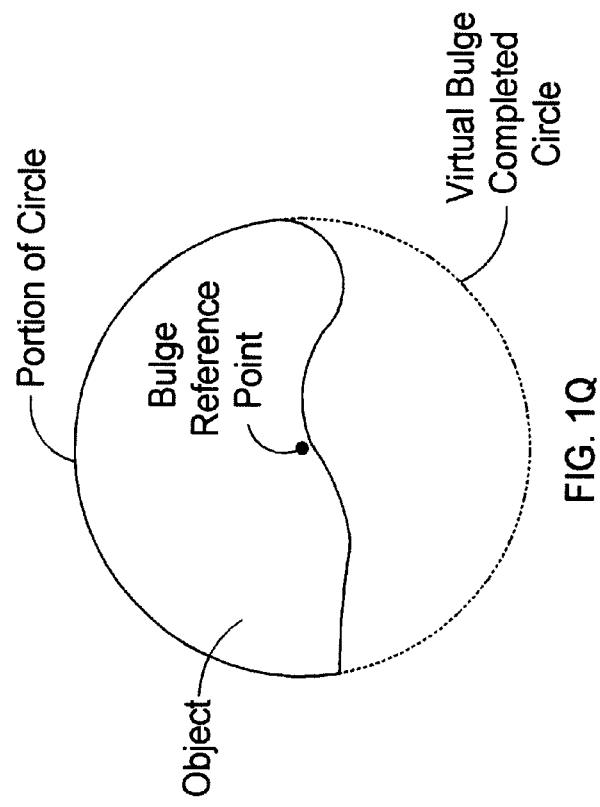
FIGS. 1P and 1Q demonstrate examples of portions of objects to which spherically shaped Virtual Bulges have been applied.
Figure 1P:
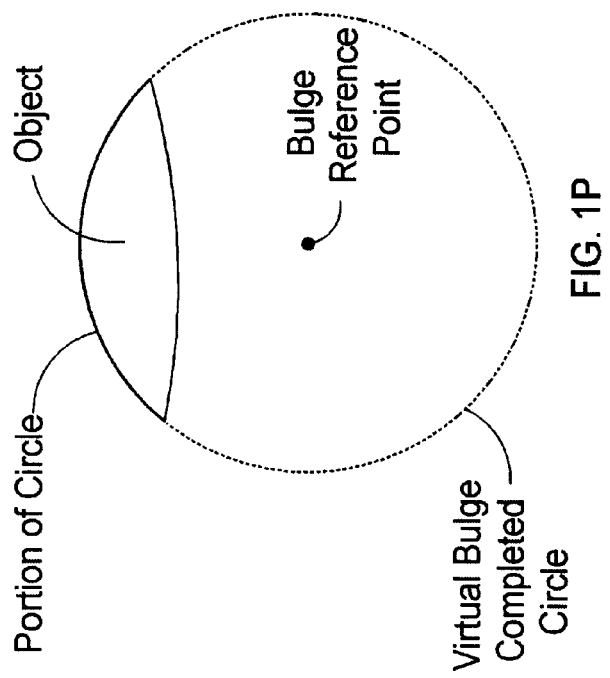

The Virtual Bulge is also very useful for defining the shape of a bulge where only a portion of the object is visible in the image. By so defining the shape of the bulge, the shape of the object is maintained independent of whether other objects are moved in front of the object that has the Virtual Bulge applied to it or whether objects are moved out of the way revealing more of the object that has the Virtual Bulge applied to it. FIGS. 1P and 1Q demonstrate examples of portions of objects to which spherically shaped Virtual Bulges have been applied. According to an embodiment of the present invention, the user completes the shape of the object creating a virtual object, in the case of these examples a circle, and then establishes a reference point for the bulge. In the case of a spherically shaped Virtual Bulge as applied in these examples, the reference point is a virtual center point that can be automatically determined and placed in consideration of the boundary perimeter of the virtual object or manually established employing any of the tools discussed herein.

An image processing system for converting two-dimensional images into three-dimensional images according to an embodiment of the present invention includes an interactive user interface configured to allow a user of the system to complete a full shape of a partial visible portion of a shape of a defined object in a two-dimensional image, the full shape of the partial object portion being a virtual object, as if the full object portion was visible and not hidden, having associated with it information pertaining to visible surface contours within a perimeter boundary of the defined object and hidden surface contours outside the perimeter boundary, the interactive user interface being configured to generate a three-dimensional image that shows the hidden surface contours when image objects in the two-dimensional image are repositioned such that a previously hidden portion of the image object is revealed.

Figure 1S:
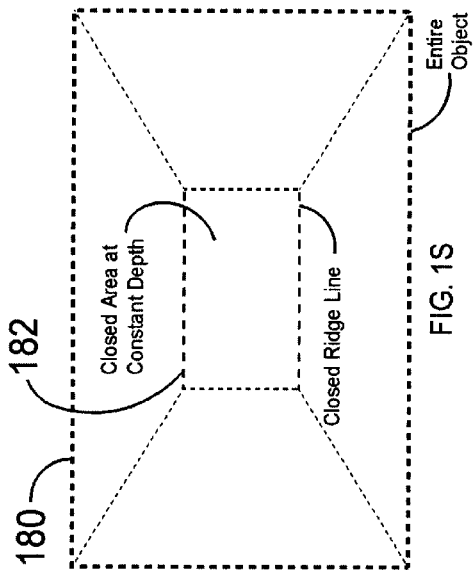
FIGS. 1R–1U demonstrate an exemplary application of a linear cross section bulge to an object containing a closed contour ridge line.
Figure 1U:
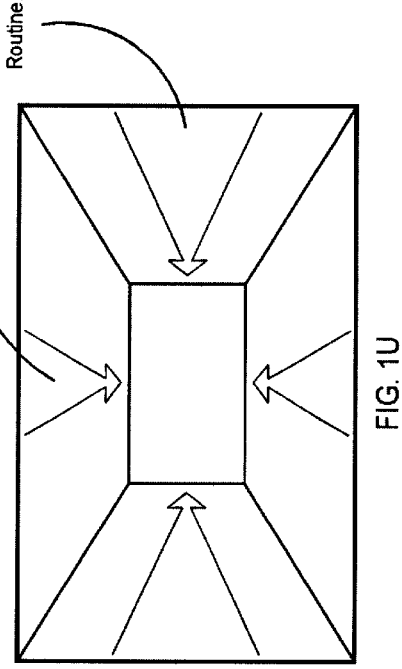
Figure 1R:
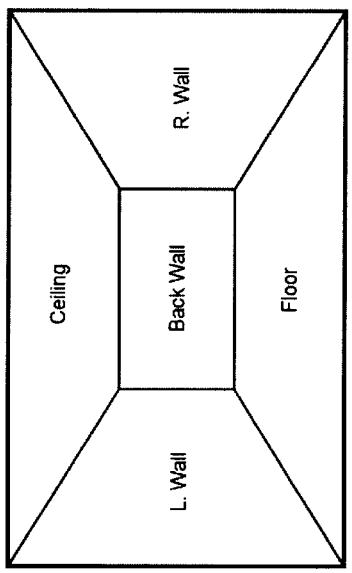
Figure 1T:
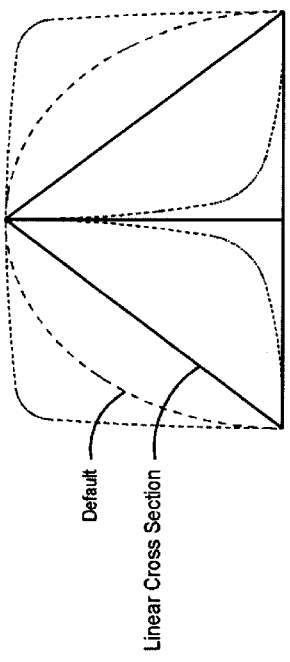

An additional feature of the present invention is the ability to utilize paths identifying areas within images (e.g., "closed" contour ridge lines) for a wide variety of applications. As discussed below, one such application involves employing closed contour ridge lines within a defined object to recreate the object as a three-dimensional image. Referring to FIG. 1R, an image of a room is shown. The room has a left wall, a right wall, a floor, a ceiling and a back wall. In FIG. 1S, the defined object for the room is shown. In this example, the boundary perimeter 180 of the room object takes up the entire field of view of the image, and a contour ridge line or path 182 is defined around the back wall. Also in this example, the contour ridge line happens to be closed. However, it should be understood that the paths do not have to be "closed" in order to serve the function of identifying an area within a defined object. In this exemplary application, the entire area of the object identified by the path 182 is assigned a common depth value, while the other areas of the object (between the boundary perimeter 180 and the path 182) are assigned depth values according to a selected algorithm and in consideration of the depth value assigned to the area identified by the path 182. This depth value and the parameters of the afore-mention algorithm are adjusted as desired by the user to achieve the desired visual effect. In this example, the area of the object outside the path 182 is "pushed back" in depth by having the linear cross section bulge applied to it, rather than a spherical or circular shaped bulge. Pushing back the wall, or rather, applying a bulge, causes the left and right wall to skew, the ceiling and floor to stretch, and the back wall to reposition itself accordingly with the edges of the walls maintaining their adjoined arrangement. This occurs by virtue of the minimization distancing of the meshing routine (discussed below). FIG. 1U demonstrates the end result of the room positioned inward in depth, or away from the viewer. If the linear bulge where applied with the opposite polarity, the effect would be the opposite with the room bulging outward toward the viewer rather than away from the viewer.

An image processing system for converting two-dimensional images into three-dimensional images according to an embodiment of the present invention includes an interactive user interface configured to allow a user of the system to apply a path identifying an area within an object of a two-dimensional image, the two-dimensional image to become one of the images of a three-dimensional image, and to adjust depth information associated with an area defined by the path that results in changes in a perceived depth of the area and of its adjoining surfaces relative to a perimeter boundary of the defined object in the three-dimensional image.

Sub-Objects

Figure 8A:
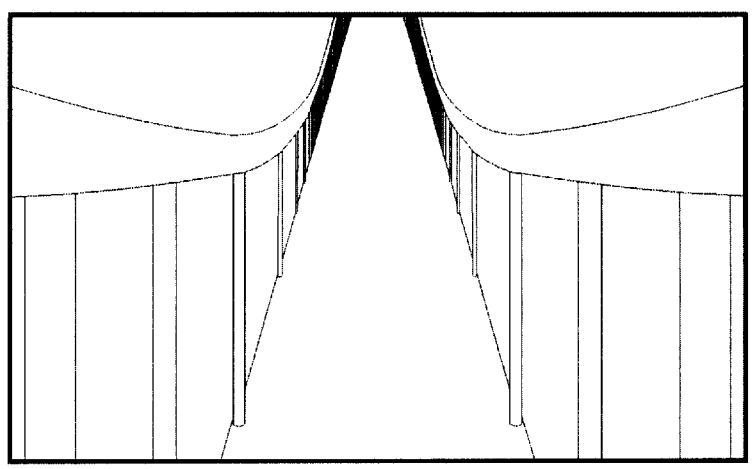
FIGS. 8A–8F illustrate exemplary Sub-Objects according to the present invention and how the amount of roundness to be applied across an object can be determined by associating contours with skew and/or stretch information that has already been applied to a defined object.
Figure 8B:
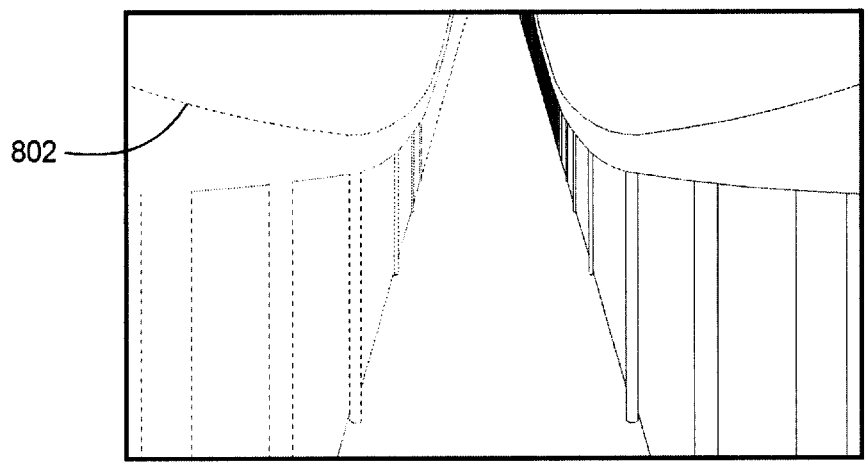
Figure 8C:
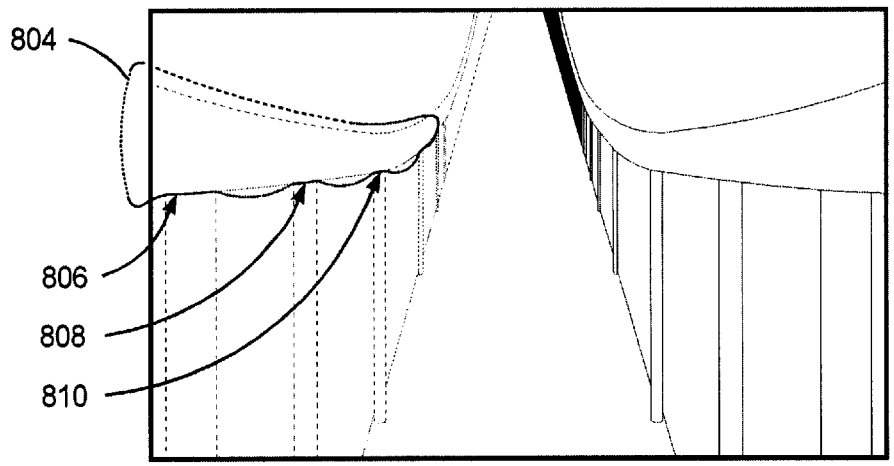

According to the present invention, objects can be divided into subportions or Sub-Objects and depth information can be individually applied to each Sub-Object. As a single object sometimes has many different contours of depth or dimension, this feature is particularly useful in recreating realistic appearing three-dimensional images. For example, FIG. 8A depicts an image 800 of a bridge held by round cables that stretch from the foreground into the background of the image. FIG. 8B shows a defined object 802 for the cables on the left side of the bridge. In this example, the operator may wish to define a sub-object of the object 802, namely, a sub-object comprising the top (horizontal) cable as it appears in the foreground portion of the image. The reason for this is that at a certain point in the distance (background portion of the image), the roundness of the cable will not likely be discernable and therefore need not be included in the area of pixels to be shifted for purposes of creating the desired effect. According to the present invention, this foreground section of the left top cable can be defined as a sub-object by utilizing already-existing information pertaining the entire cable defined object 802. Referring to FIG. 8C, this foreground section of the cable can be conveniently defined as a sub-object by drawing a line 804 around the portion of the left cable that is to make up the sub-object. Rather than having to redefine the top portion of the cable, the operator simply draws around it to capture the already existing object path line. At locations 806, 808 and 810 on the image, where the left top cable connects with three foreground vertical cables, it may be desirable for the operator to exercise greater care (as shown in FIG. 8C) in drawing the line 804. The foreground portion of the left top cable has now been defined as a sub-object. FIG. 8F is a further example showing one of the foreground vertical cables being defined as a sub-object of the object 802 by drawing a line 812 as shown so that round contours can also be applied to this sub-object for an enhanced more realistic effect.

An image processing system for converting two-dimensional images into three-dimensional images according to an embodiment of the present invention includes an interactive user interface configured to allow a user of the system to view a perimeter boundary of a first defined object of a two-dimensional image, designate a portion of the perimeter boundary, and employ the portion to create a second defined object which facilitates an identification of pixels to be horizontally displaced to create an image for a three-dimensional image. In a preferred embodiment, the interactive user interface includes a drawing tool configured to allow the user to designate a portion of the perimeter boundary by drawing around it.

Figure 8D:
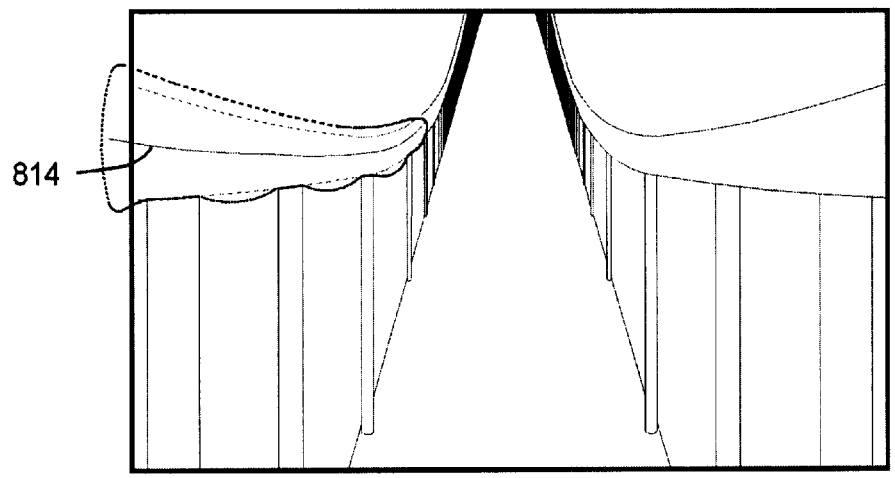
Figure 8E:
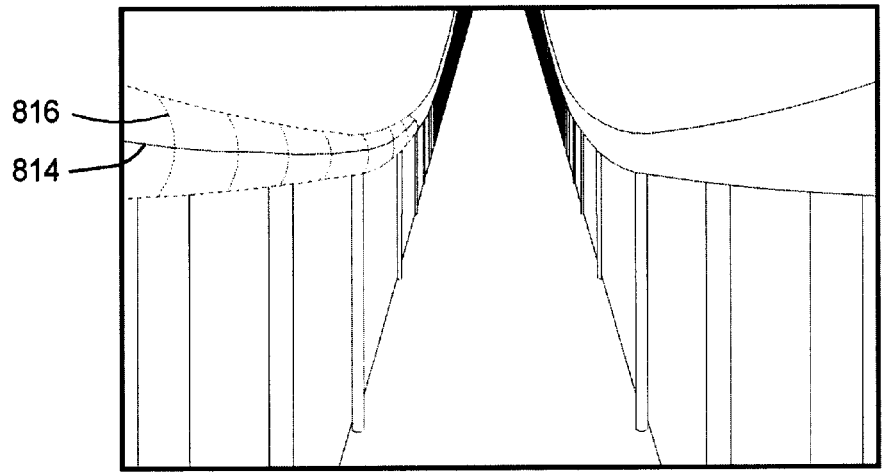
Figure 8F:
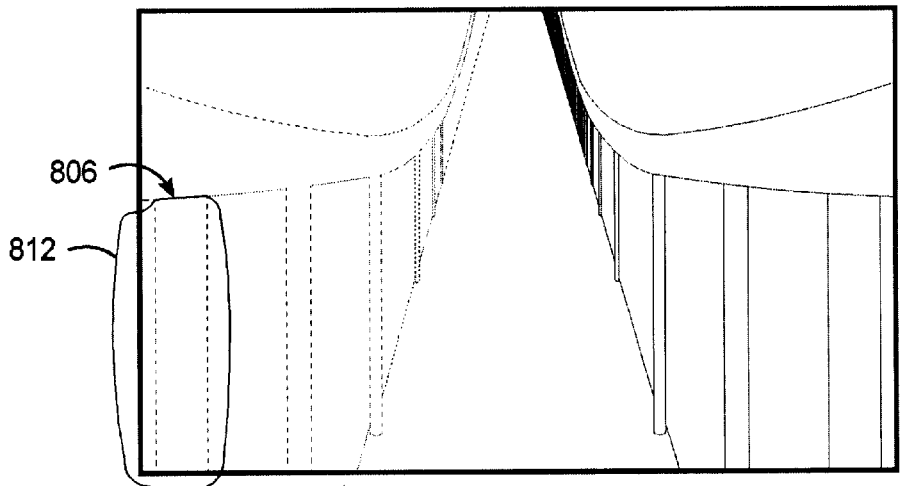

Referring to FIGS. 8D and 8E, a procedure is now discussed for restoring the roundness, or contour, of the left cable foreground sub-object. In this example, the amount of circular bulging that is applied to the cable in the foreground needs to be more than the amount of perceptible bulge that exists in the background. Accordingly, the amount of contour bulging amplitude should be decreased, e.g., in a proportional manner, moving along the cable toward its background portion. As shown in FIG. 8D, a path line 814 is applied along a crest of the sub-object. According to the present invention, the amount of roundness to be applied from foreground to background can be determined by associating contours with skew and/or stretch information that has already been applied to a defined object. In this manner, the amount of bulge roundness (depicted, in FIG. 8E, by a curve 816 at one location along the sub-object) becomes proportional to the amount of depth of the cable as it runs into the distance. The end result is a three-dimensional image of cable with its original roundness appearing realistic from foreground to background.

An image processing system for converting two-dimensional images into three-dimensional images according to another embodiment of the present invention includes an interactive user interface configured to allow a user of the system to apply one or more points or straight or curved path lines within a defined object of a two-dimensional image, and to generate a three-dimensional image that shows surface contours between a boundary perimeter of the defined object and the one or more points or straight or curved path lines, wherein the interactive user interface is configured to employ information already associated with a defined object to adjust a shape of the surface contours. In a preferred embodiment, the information comprises depth information that is employed by the system to automatically determine surface contour changes along a path line applied to the defined object. In a preferred embodiment, the information comprises skew or stretch information that is employed by the system to determine variations in the shape of the surface contours from foreground to background.

An image processing method for converting two-dimensional images into three-dimensional images according to another embodiment of the present invention includes the steps of: applying a straight or curved path line within a defined object of a two-dimensional image; associating the path line as points of a crest or trough; and displacing a plurality of image pixels of the two-dimensional image to provide a three-dimensional image in which the crest or trough appears within the three-dimensional image to transition in depth along the path line, the crest or trough contouring from all points on the path line towards a boundary perimeter of the defined object. In a preferred embodiment, the step of applying the path line comprises: freehand drawing the path line within the defined object.

Triangular Meshing Algorithm

The triangular meshing routines of the present invention generate a continuous, "well behaved", convex mesh of triangles with vertices defined by an input set of points defined in 2+1 real space. Each point has two coordinates in the real Cartesian plane and one depth coordinate that may be loosely thought of as a third real coordinate. This mesh is then lifted off of the real plane according to the depth value of each of the defining points of the mesh.

A continuous mesh denotes a mesh with no "holes" in it, i.e., all of the area within the convex hull of the mesh is filled with triangles. A "well behaved" mesh denotes a mesh that, when lifted off of the plane, approximates a smooth 2-dimensional surface, in the sense of a continuous tangent space, embedded in real 3-space, i.e., a surface with no jagged edges or cusps.

Figure 9:
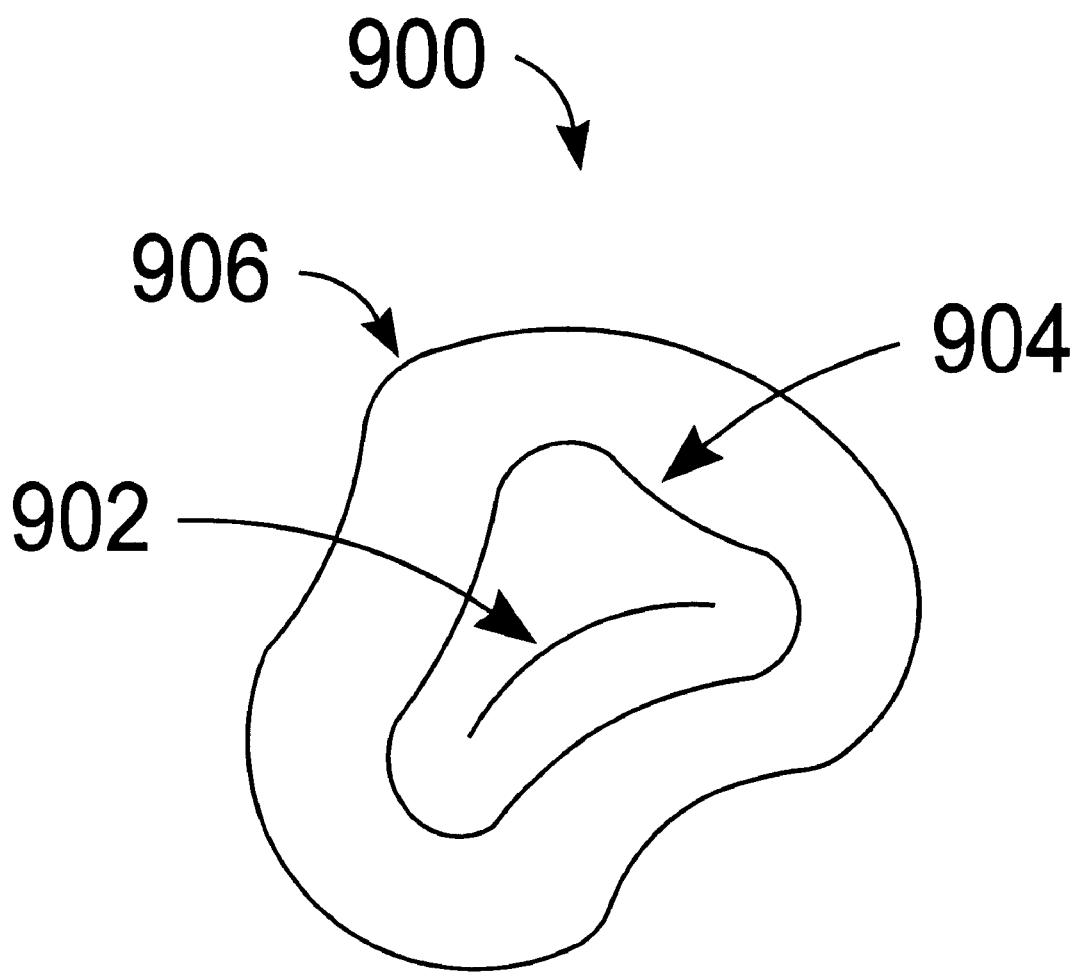
FIG. 9 depicts two closed contours and a "ridge" contour.

The input of the algorithm is a list of points with real x and y coordinates and a real depth value that corresponds to the screen viewing depth. These points are defined in multiple disjoint sets termed "contours", each set being composed of points with the same depth value. In FIG. 9, an image 900 has a "ridge" contour 902 and surface contours 904 and 906. These contours are analogous to contours on a topographical map with each contour defining a screen depth rather than an altitude.

The output is a list of triangles in real 2+1-space (real plane plus depth) and the corresponding plane in real 3-space that each triangle lies in.

Triangular Meshing Algorithm Details
Working in the Real Plane

Figure 10B:
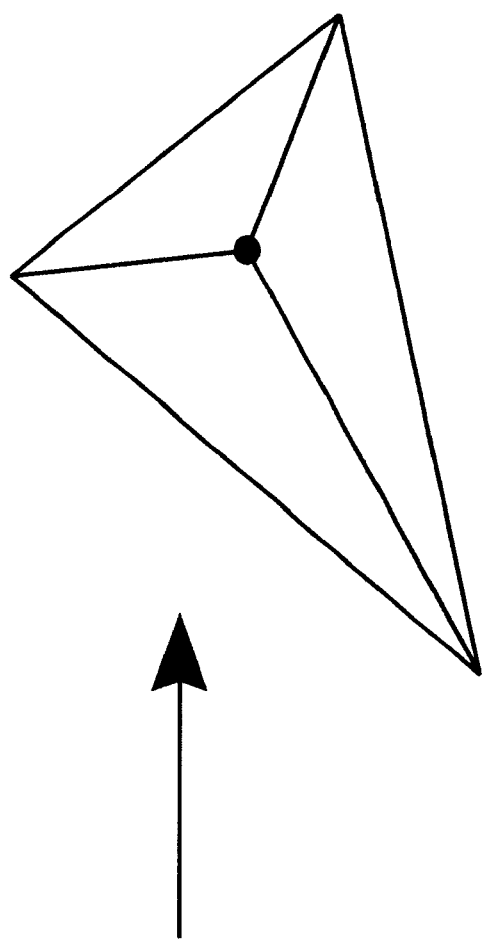
FIGS. 10A and 10B illustrate a step in the process of creating the mesh of the present invention when a point is found inside of a triangle of the mesh.
Figure 10A:
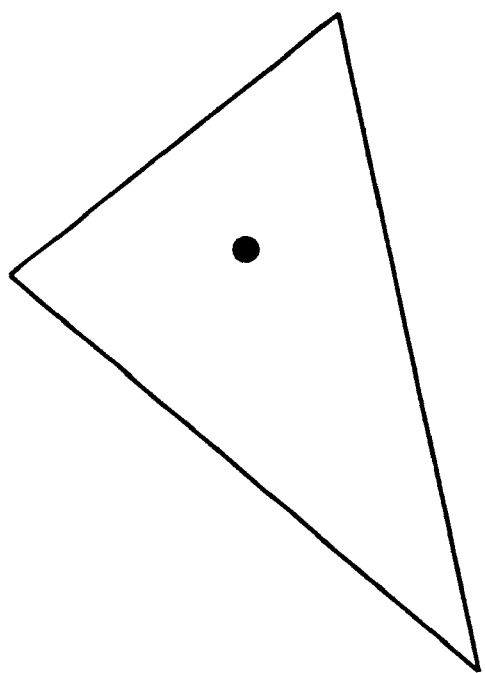

A triangle is constructed from the input points such that all of the points in the input list lie inside it. The list of points is then read through. Each time a point is found inside of a triangle, the triangle is split into three triangles defined by four points: the three vertices of the original triangle and the point found inside the original triangle. For example; the first point in the list will be found to lie inside of the original constructed triangle (all of the points do by construction) so that the triangle is divided into three new triangles. Another point from the list will be found inside one of these triangles and three other triangles will be constructed within that triangle. FIGS. 10A and 10B demonstrate a step of this process.

Each time a point is found to lie on the edge of a triangle, the triangle is divided into two new triangles defined by the original triangle and a line segment from the point on the edge to the vertex opposite that edge. The same is done to the triangle that shares the edge with the point. FIGS. 11A and 11B demonstrate a step of this process.

After a point in the list is found to be in the interior or on the boundary of a pre-existing triangle, and new triangles are constructed accordingly, the point is no longer searched for or used to construct other triangles in the manner discussed above. This general method is followed until all points in the list have been found.

During the meshing process, it is necessary to take steps to ensure that the final result will model a smooth surface. There are two primary issues addressed in the meshing scheme to ensure smoothness. One issue is how to choose which points belong to which triangles. This is an important check step after a new point has been found and new triangles have been constructed. It is important that triangles are, in general, defined by points that are close to each other in an appropriate sense. All depth values in a triangle are given by the plane that the three vertices of the triangle lie in. This means that the mesh is a piecewise linear approximation of a surface, and the closer the data used for approximation is to the computed values, the better the approximation is. Without this check, a surface filled with steep, long valleys and cusp peeks may be constructed rather than a smooth surface.

Figure 12A:
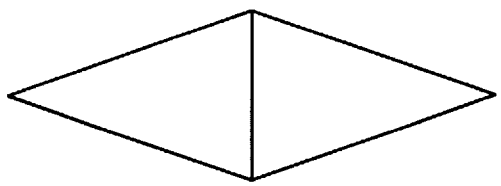
FIGS. 12A and 12B demonstrates good and bad triangle approximation, respectively.
Figure 12B:
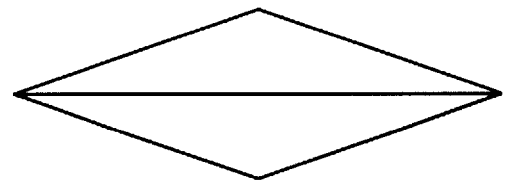
Figure 13C:
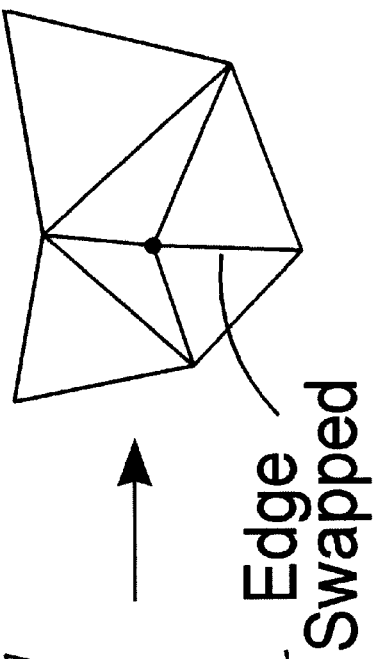
FIGS. 13A–13C demonstrates how edges of the mesh may be swapped according to the present invention.
Figure 13B:
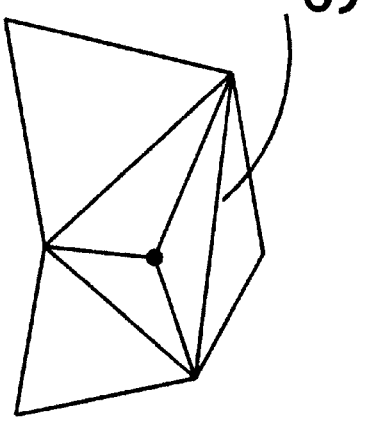
Figure 13A:
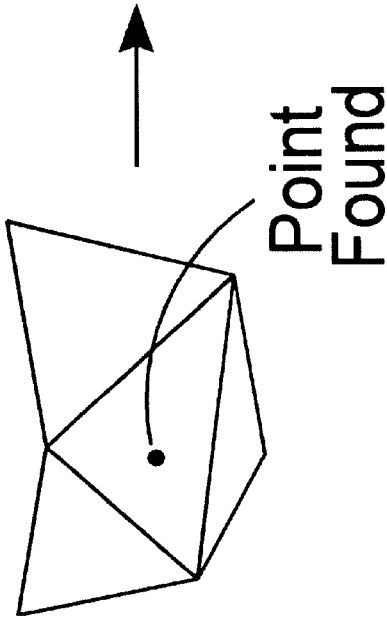

The two choices possible for constructing two triangles from the same four points will produce a very different surface. According to the present invention, FIGS. 12A and 12B demonstrates good and bad triangle approximation, respectively. Each time a new point is found, and new triangles are constructed with the point, new edges are checked to ensure that they are as short as possible given the surrounding triangles. If this is not the case, then the edge is swapped in the manner illustrated in FIGS. 13A–13C.

Distance Minimization

Since switching the edges of a triangle may locally affect the distance relationships of vertices of other triangles, the distance minimization routine is applied in a recursive manner so that all local triangles are checked and updated appropriately. One result of this is that after completion of the distance minimization routines, the algorithm produces one unique mesh for a particular set of points, no matter what order the points are found in, and the total edge length of all triangles in the mesh is minimal.

Smoothness

The second issue is how each triangle is defined relative to the contours. A triangle is considered to be "cross-contour" if two of its vertices lie on one contour and the third lies on the next consecutive (higher or lower) contour. Whether all the triangles are cross-contour or some of the triangles are not has a considerable impact on the shape of the mesh surface and the accuracy of the mesh in providing a surface approximation.

Figure 14B:
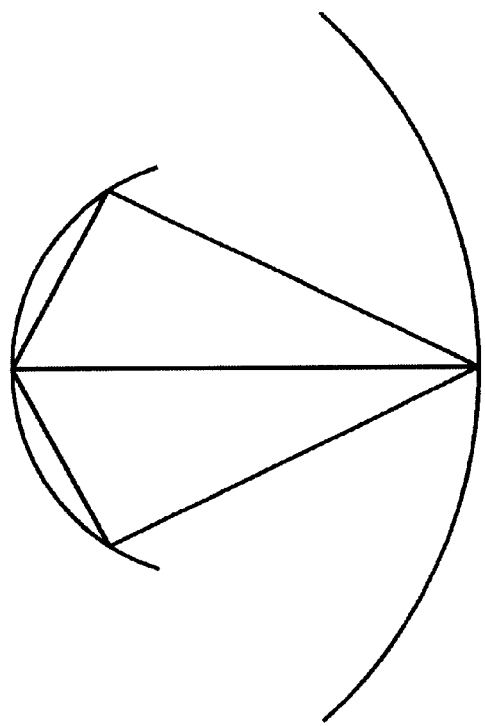
FIGS. 14A and 14B illustrate before and after forced cross-contouring, respectively.
Figure 14A:
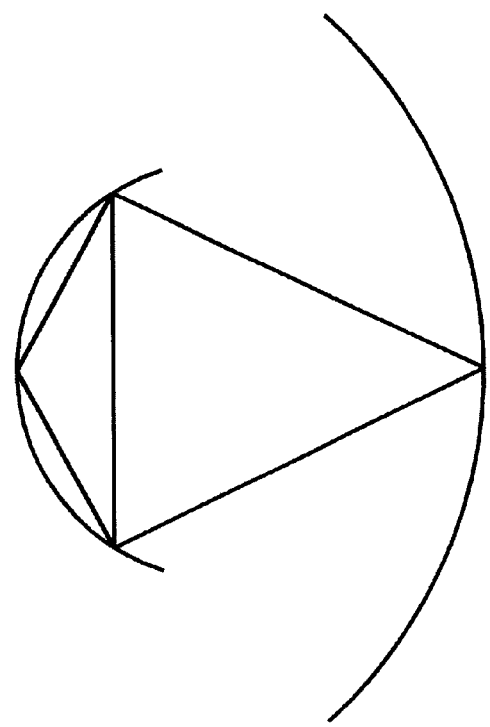

This is the last issue impacting the basic shape of the mesh that is considered during the meshing process. Once a complete mesh is constructed with distance minimization, each triangle in the mesh is checked to ensure that it is cross-contour. In general, this will not be the case, and the mesh is recursively adjusted so that all triangles are defined on two consecutive contour levels while retaining a minimal distance between connected points. FIGS. 14A and 14B illustrate before and after forced cross-contouring, respectively. In FIG. 14A, one of the triangles is defined on only a single contour, prior to the cross-contouring which adjusts the mesh to provide the triangles shown in FIG. 14B.

Next a smoothing routine is applied. This step removes any sharp drops or peaks that may have occurred during the distance minimization process and cross-contour forcing due to points on the center ridge being further apart than the width of the object. FIG. 15 illustrates an exemplary application of the surface smoothing routine of the present invention. In this figure, it can be seen that an initial mesh generated employing distance minimization and cross-contour forcing can yield a ridge line that is distorted. Although these peaks and drops (along the ridge) adhere to the distance and contouring constraints, they nevertheless produce an unwanted jagged appearance that is remedied during the smoothing process. The end result is a mesh that gives a close surface approximation by ensuring a consecutive and regular progression from one depth level to another and approximating unknown depth values (i.e., non-vertex depth values) with the closest possible depth data—data from close points in the mesh. In the illustrated example, the ridge line is preserved and the cross-contouring condition is still met even though distance minimization at some points has been overridden for smoothness.

Continuity

Continuity is ensured by the recursive nature of constructing new triangles from old triangles and found points. Since each set of new triangles is contained in a previously constructed triangle and each of these sets (as the union of the triangles it is composed of) contains the triangle that it is constructed from, there will be no gaps in the mesh.

Removing Unwanted Triangles

Because the process of creating the mesh starts with an initial triangle that contains all points in the point list in its interior, but is defined by three points not in the point list, there are triangles produced that are not part of the intended mesh and these are removed after the mesh in the plane is generated. This is accomplished by removing all triangles that have one or more of the three points, which not contained in the input list of points, as vertices.

Refinement

Figure 16A:
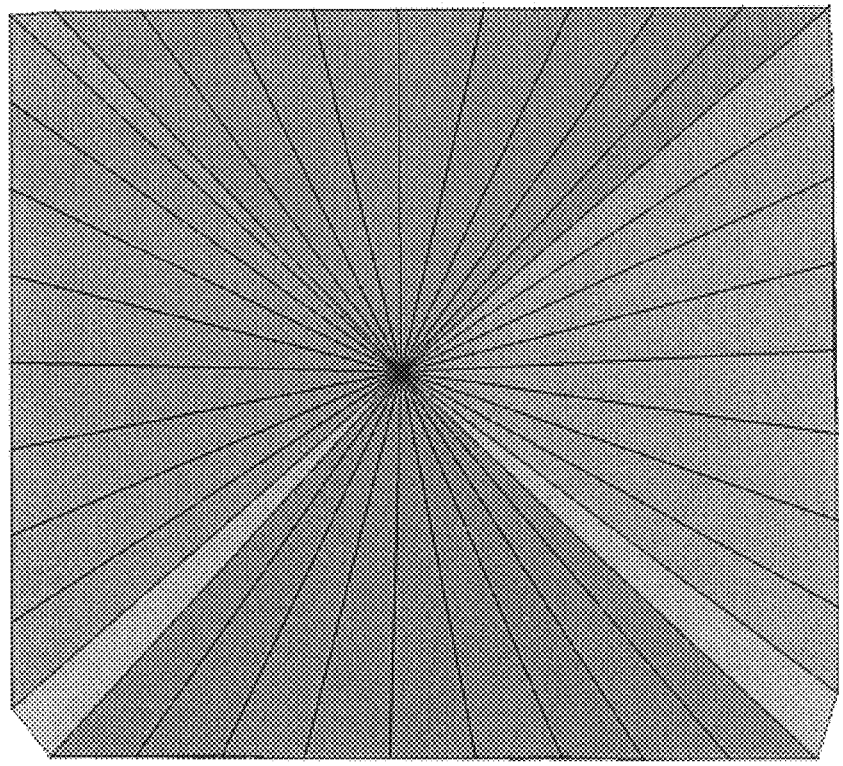
FIG. 16A depicts an exemplary initial meshing stage.

The above meshing steps are applied only to the points in the outside path that defines the object and the ridge line peaks(s) and trough(s) that the user specifies. This creates an initial mesh of triangles that connects the ridges to the outside path in a radial manner (FIG. 16A, by way of example) and defines a linear surface approximation when a depth coordinate is applied as discussed in the next section.

To generate more contour levels and triangles defined on these contours, each triangle in the mesh is divided up according to a non-negative input parameter, N. The number of contours that the final mesh has can be expressed as:

number of contours=$2^N$+1.

Figure 16B:
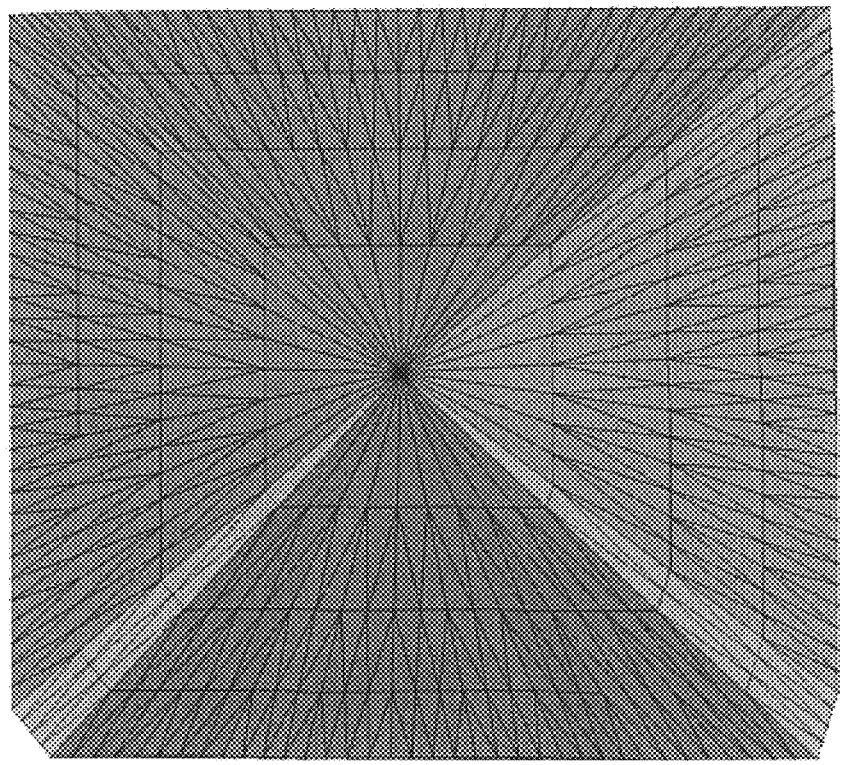
FIG. 16B depicts the mesh of FIG. 16A after two refinement steps.
Figure 16C:
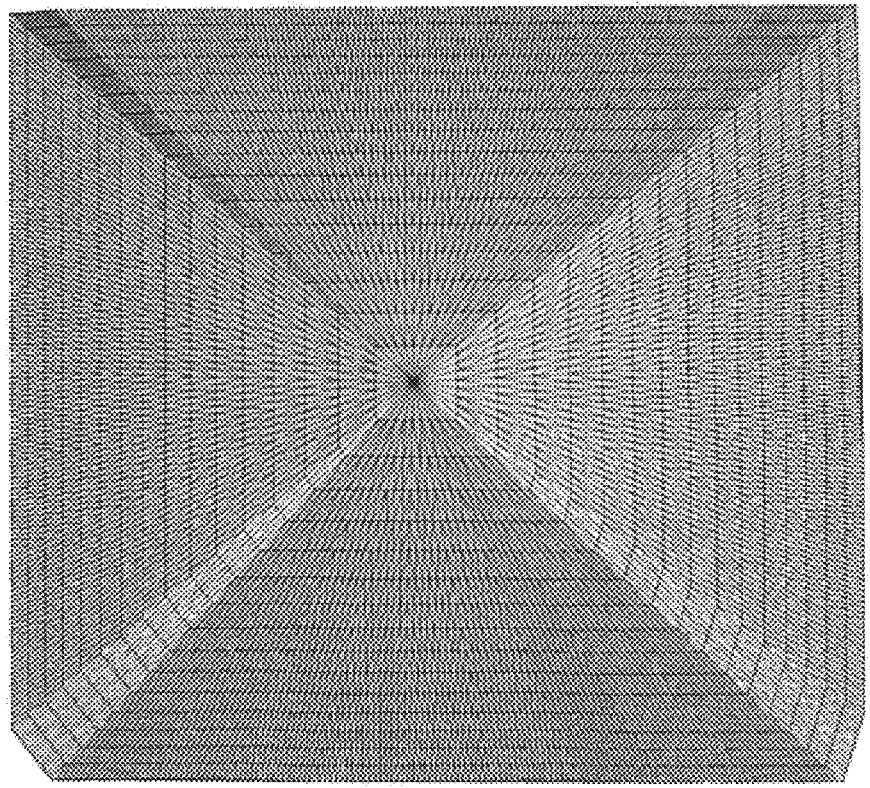
FIG. 16C depicts a mesh of FIG. 16A after four refinement steps.

Once the target number of contours is determined, the existing triangles are refined accordingly by recursively applying a division algorithm until the desired number of contours is reached. For example, if N=2 and there is one point-ridge, then there will be five contours, including the outside path and the ridge-point (FIG. 16B), and if N=4, then there will be 17 contours (FIG. 16C).

Further with regard to triangle division/refinement, FIGS. 17A–17D diagram another example of recursive triangle refinement from two contours to three contours, and then from three contours to five contours.

Embedding the Mesh as a Surface in 3-Space

The depth coordinate is not used during the construction of the mesh except to ensure that all triangles are cross-contour. When the mesh is complete in the plane, the depth value of each of the points in the triangular mesh is used to give each triangle vertex a third real coordinate.

Applying the Triangular Mesh to Give the Appearance of Depth

The purpose of generating a triangular mesh is to provide a structure (or framework) for giving a visual object a realistic appearance of depth. This is accomplished by assigning all of the pixels contained in each triangle of the mesh the depth value of the point on the triangle directly above the pixel. In a sense, every pixel, as a point on the real plane embedded in real 3-space, is projected up onto the plane of the triangle in the mesh above (or below) the point.

The Triangular Meshing Algorithm and Contouring

The triangular meshing algorithm and the method of surface contouring are combined to give variant depth and shape to the surface of graphical objects during the Dimensionalization process. These two methods are implemented at the user interface. As described in the Objects and Contouring section above, a user first defines an object by drawing a closed path around the desired graphical object on the view screen. The user may then draw ridge paths or points within the boundary path. Each of these paths is input to the meshing algorithm as distinct contours in the form of distinct lists of the points that make up each path. The number of points selected from a given path for inclusion in the list, e.g., every fifth pixel along the path, can take into consideration various factors such as the nature of the object, resolution required, processing power available, etc.

The user can also select the number of contours that the final mesh will contain (in a preferred embodiment, a default number of contours is also provided in the software). The appropriate number of contours is then generated with the triangle refinement routines.

Finally, the user can input the general shape of the surface (an exemplary default shape is parabolic), and the contours are lifted or dropped the appropriate depth based on this shape.

FIGS. 18A–18G diagram the general stages of the contouring and meshing processes of the present invention on a square-shaped object and a ridge positioned within the object.

Figure 16D:
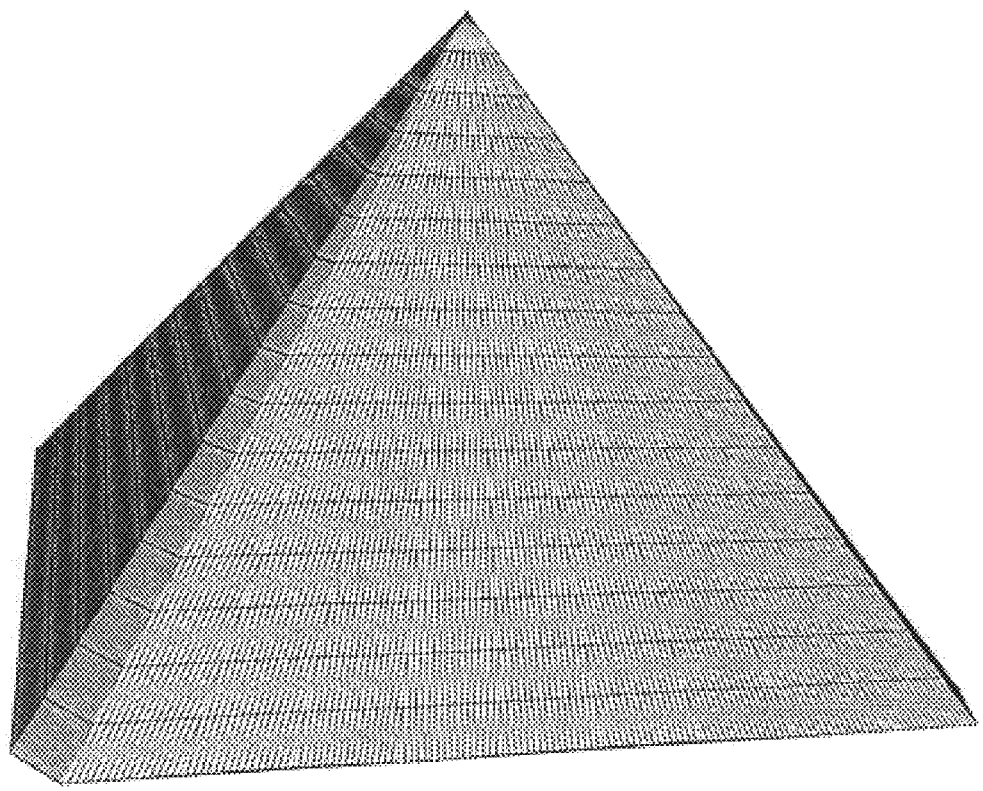
FIG. 16D is a perspective view of an object after a linear cross-section shape has been applied to it.
Figure 16E:
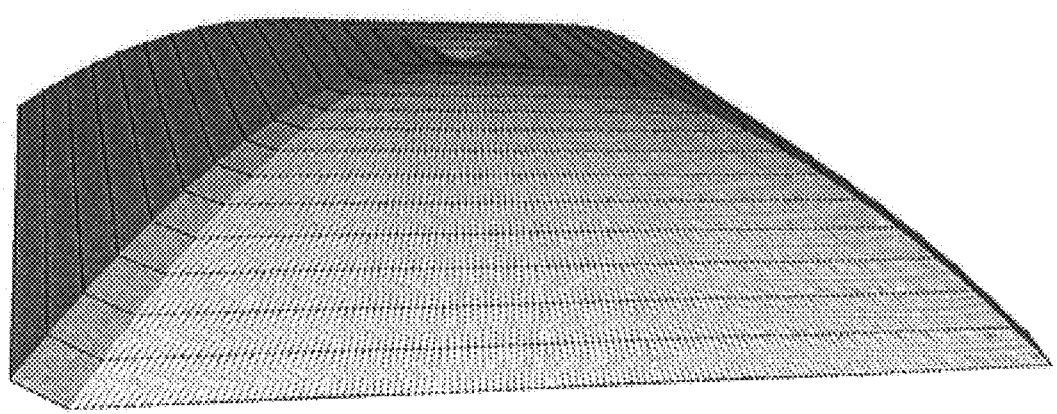
FIG. 16E is a perspective view of the object of FIG. 16D but instead with a more rounded cross-section shape applied to it.
Figure 18A:
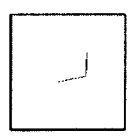
FIG. 18A depicts an exemplary boundary perimeter and a ridge path therein.
Figure 18B:
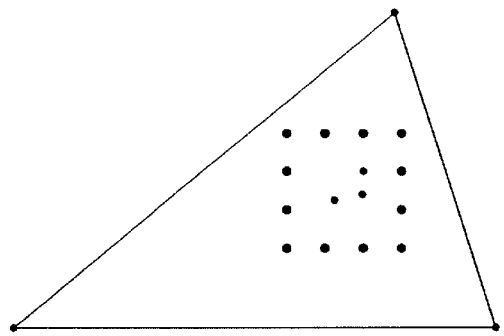
FIG. 18B depicts an initial containment triangle positioned around the boundary perimeter and ridge path of FIG. 18A.
Figure 18C:
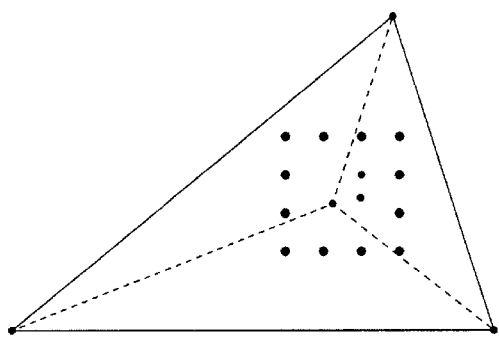
FIG. 18C depicts the splitting of the initial containment triangle of FIG. 18B into three triangles employing a selected point of the ridge path as a common vertex point for the three new triangles.
Figure 18D:
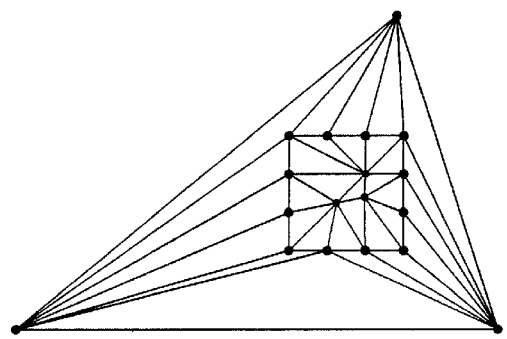
FIG. 18D depicts an example of the triangle of FIG. 18C with distance minimization meshing completed.
Figure 18E:
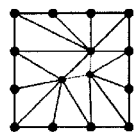
FIG. 18E depicts the triangle mesh of FIG. 18D with non-object triangles removed.
Figure 18F:
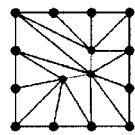
FIG. 18F depicts the triangle mesh of FIG. 18E with forced cross-contours and smoothing routines applied.
Figure 18G:
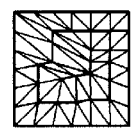
FIG. 18G depicts the triangle mesh of FIG. 18F with an additional level of triangle refinement added.

1) The user defines a boundary perimeter for the object and a ridge within the object (FIG. 18A).
2) The meshing software constructs an initial triangle that contains the object path points (FIG. 18B). In this example, twelve points were taken from the boundary perimeter path and three points were taken along the ridge path.
3) A first point of the ridge path (selected by the user) is employed along with the vertices of the initial containment triangle to split the initial containment triangle into three new triangles (FIG. 18C).
4) After all of the points have been processed, the result is the initial distance minimization meshing (FIG. 18D).
5) All non-object triangles, i.e., triangles outside the boundary perimeter, are removed (FIG. 18E).
6) Cross contour forcing and smoothing routines are applied (FIG. 18F). In this example, this processing step salvages the ridge contour that was lost when applying only the distance minimizing scheme.
7) The user specifies three contours, causing one level of triangle refinement (FIG. 18G).
8) Finally, the user specifies the general shape of the surface, and the contours are lifted accordingly. The same mesh produces different shapes for the same object, depending on the input shape and the desired amplitude of the ridges. This is exemplified by a comparison of the objects in FIGS. 16D and 16E which share a common mesh but have different input shapes.

An image processing method for converting two-dimensional images into three-dimensional images according to another embodiment of the present invention includes the steps of: processing data associated with a defined object and one or more ridge points or path lines within a two-dimensional image to generate a mesh pattern of triangles that overlays the two-dimensional image; and associating pixel depth values with the mesh pattern of triangles to create three-dimensional surface contours for rendering the two-dimensional image into a three-dimensional image. In a preferred embodiment, the data associated with the defined object comprises locations of points that are positioned along a boundary perimeter of the defined object. In a preferred embodiment, the data associated with the path lines comprises locations of points that are positioned along the path lines. In a preferred embodiment, the data processing step comprises: defining triangles of the mesh pattern with vertices taken from points along a boundary perimeter of the defined object and from the one or more ridge points. In a preferred embodiment, the data processing step comprises: defining triangles of the mesh pattern with vertices taken from points along an outline of the defined object and from points along the one or more path lines. In a preferred embodiment, the data processing step comprises: defining triangles of the mesh pattern such that the triangles obey one or more rules pertaining to distance minimization between vertices of the triangles. In a preferred embodiment, the triangles are defined employing a recursive processing technique and/or employing an edge swapping technique. In a preferred embodiment, the data processing step comprises: defining triangles of the mesh pattern such that the triangles obey one or more rules pertaining to vertices of the triangles crossing contours. In a preferred embodiment, the pixel depth values correspond to a (three-dimensional) surface shape that is applied to the mesh pattern. In a preferred embodiment, the pixel depth values correspond to a desired amplitude of the mesh pattern.

In a preferred embodiment, the image processing method for converting two-dimensional images into three-dimensional images further includes the step of processing the data associated with the mesh pattern employing an edge smoothing processing technique to further modify the triangles of the mesh pattern prior to the step of associating pixel depth values. In a preferred embodiment, the edge smoothing processing technique further modifies the triangles such that one edge of each triangle corresponds to a surface contour and the other two edges are cross contour.

In a preferred embodiment, the image processing method for converting two-dimensional images into three-dimensional images further includes the step of processing the data associated with the mesh pattern employing a triangle refining processing technique to further modify the mesh pattern to accommodate one or more additional surface contours prior to the step of associating pixel depth values. In a preferred embodiment, the triangle refining processing technique determines the one or more additional surface contours in response to a desired level of contour resolution.

Naturally, products generated by any of the systems or methods disclosed herein also fall within the scope of the present invention. Such products include, but are not limited to, any three-dimensional image generated employing any of the methods or systems described herein as well as any form of device upon which is stored information (or data) pertaining to any such three-dimensional image (e.g., machine-readable storage media such as digital video disks, digital tape, etc.). Any data storage media that stores images, information or data created employing any of the methods or systems described herein also falls within the scope of the present invention.

Those skilled in the art will appreciate that various adaptations and modifications of the just described preferred embodiment can be configured without departing from the scope and spirit of the invention. For example, tools that can help differentiate certain values within an image such as hue and saturation of a color, or brightness value can also be employed to assist with recognizing and defining objects. Motion can also be used to help recognize and define objects. Therefore, it is to be understood that, within the scope of the appended claims, the invention may be practiced other than as specifically described herein.

We claim:

1. An image processing system for converting two-dimensional images into three-dimensional images, comprising:

an interactive user interface providing an object drawing tool configured to allow a user of the system to apply one or more straight or curved path lines within a defined object of a two-dimensional image, the interactive user interface being configured to generate from the two-dimensional image a three-dimensional image in which one or more of the path lines appears to the user as a ridge protruding toward or away from the user, the ridge contouring from all points on the path line towards a boundary perimeter of the defined object.

2. The image processing system for converting two-dimensional images into three-dimensional images of claim 1, wherein the interactive interface is configured such that the object drawing tool allows the user to freehand draw the one or more straight or curved path lines within the defined object.

3. An image processing method for converting two-dimensional images into three-dimensional images, comprising the steps of:

freehand drawing a straight or curved path line within a defined object of a two-dimensional image;

associating the path line as points of a crest or trough; and displacing a plurality of image pixels of the two-dimensional image to provide a three-dimensional image in which the crest or trough appears within the three-dimensional image to transition in depth along the path line, the crest or trough contouring from all points on the path line towards a boundary perimeter of the defined object.

4. An image processing method for converting two-dimensional images into three-dimensional images, comprising the steps of:

applying one or more straight or curved path lines within a defined object of a two-dimensional image;

associating surface contours of a three-dimensional shape with the path lines; and generating a graphical representation of the surface contours along the path lines.

5. The image processing method for converting two-dimensional images into three-dimensional images of claim 4, wherein the step of generating a graphical representation comprises:

rotating the graphical representation to correspond to a different perspective view of the surface contours.

6. An image processing system for converting two-dimensional images into three-dimensional images, comprising:

an interactive user interface configured to allow a user of the system to view a perimeter boundary of a first defined object of a two-dimensional image, designate a portion of the perimeter boundary, and employ the portion to create a second defined object which facilitates an identification of pixels to be horizontally displaced to create an image for a three-dimensional image.

7. The image processing system for converting two-dimensional images into three-dimensional images of claim 6, wherein the interactive user interface includes a drawing tool configured to allow the user to designate a portion of the perimeter boundary by drawing around it.

8. An image processing system for converting two-dimensional images into three-dimensional images, comprising:

an interactive user interface configured to allow a user of the system to apply one or more points or straight or curved path lines within a defined object of a two-dimensional image, and to generate a three-dimensional image that shows surface contours between a boundary perimeter of the defined object and the one or more points or straight or curved path lines;

wherein the interactive user interface is configured to allow the user to adjust a shape of the surface contours about one or more of the points or path lines while viewing changes made to the surface contours.

9. The image processing system for converting two-dimensional images into three-dimensional images of claim 8, wherein the interactive user interface includes an object drawing tool configured to allow the user to freehand draw the one or more points or straight or curved path lines within a defined object.

10. The image processing system for converting two-dimensional images into three-dimensional images of claim 8, wherein the interactive user interface is configured to allow the user to designate a point or path line within the defined object as an upper or lower-most elevation within the three-dimensional image.

11. The image processing system for converting two-dimensional images into three-dimensional images of claim 8, wherein the interactive user interface is configured to allow the user to select one or more of the points or path lines and to apply a plurality of three-dimensional shapes about the points or path lines to generate the surface contours.

12. The image processing system for converting two-dimensional images into three-dimensional images of claim 11, wherein the interactive user interface is configured to allow the user to apply a plurality of shaping algorithms corresponding to the three-dimensional shapes in any combination and in any order.

13. The image processing system for converting two-dimensional images into three-dimensional images of claim 8, wherein the interactive user interface is configured to allow the user to employ a function to adjust a curved shape of the surface contours.

14. The image processing system for converting two-dimensional images into three-dimensional images of claim 8, wherein the interactive user interface is configured to allow the user to control variations in perceived depth between any two of the points or path lines.

15. The image processing system for converting two-dimensional images into three-dimensional images of claim 8, wherein the interactive user interface is configured to allow the user to change a shape of the surface contours by modifying or repositioning one or more of the points or path lines.

16. The image processing system for converting two-dimensional images into three-dimensional images of claim 8, wherein the interactive user interface is configured to allow the user to apply amplitude adjustments to the surface contours.

17. The image processing system for converting two-dimensional images into three-dimensional images of claim 8, wherein the interactive user interface is configured to allow the user to apply shape adjustments to the surface contours.

18. The image processing system for converting two-dimensional images into three-dimensional images of claim 8, wherein the interactive user interface is configured to employ information already associated with a defined object to adjust a shape of the surface contours.

19. The image processing system for converting two-dimensional images into three-dimensional images of claim 18, wherein the information comprises depth information is employed by the system to automatically determine surface contour changes along a path line applied to the defined object.

20. The image processing system for converting two-dimensional images into three-dimensional images of claim 18, wherein the information comprises skew or stretch information that is employed by the system to determine variations in the shape of the surface contours from foreground to background.

21. The image processing system for converting two-dimensional images into three-dimensional images of claim 8, wherein:
the defined object excludes one or more areas within a perimeter boundary of the defined object; and
the interactive user interface is configured to generate the three-dimensional image with the surface contours not being applied to the one or more areas such that the one or more areas appear as holes in the defined object allowing any object with its own depth properties to be visible.

22. The image processing system for converting two-dimensional images into three-dimensional images of claim 8, wherein the interactive user interface is configured to allow the user of the system to capture any portion or the entirety of a defined object of the two-dimensional image and to apply the surface contours to the captured portion of the defined object.

23. An image processing system for converting two-dimensional images into three-dimensional images, comprising:
an interactive user interface configured to allow a user of the system to apply a path identifying an area within an object of a two-dimensional image, the two-dimensional image to become one of the images of a three-dimensional image, and to adjust depth information associated with an area defined by the path that results in changes in a perceived depth of the area and of its adjoining surfaces relative to a perimeter boundary of the defined object in the three-dimensional image.

24. An image processing system for converting two-dimensional images into three-dimensional images, comprising:
an interactive user interface configured to allow a user of the system to complete a full shape of a partial visible portion of a shape of a defined object in a two-dimensional image, the full shape of the partial object portion being a virtual object, as if the full object portion was visible and not hidden, having associated with it information pertaining to visible surface contours within a perimeter boundary of the defined object and hidden surface contours outside the perimeter boundary, the interactive user interface being configured to generate a three-dimensional image that shows the hidden surface contours when image objects in the two-dimensional image are repositioned such that a previously hidden portion of the image object is revealed.

25. An image processing method for converting two-dimensional images into three-dimensional images, comprising the steps of:
processing data associated with a defined object and one or more ridge points or path lines within a two-dimensional image to generate a mesh pattern of triangles that overlays the two-dimensional image; and
associating pixel depth values with the mesh pattern of triangles to create three-dimensional surface contours for rendering the two-dimensional image into a three-dimensional image.

26. The image processing method for converting two-dimensional images into three-dimensional images of claim 25, wherein the data associated with the defined object comprises locations of points that are positioned along a boundary perimeter of the defined object.

27. The image processing method for converting two-dimensional images into three-dimensional images of claim 25, wherein the data associated with the path lines comprises locations of points that are positioned along the path lines.

28. The image processing method for converting two-dimensional images into three-dimensional images of claim 25, wherein the data processing step comprises:

defining triangles of the mesh pattern with vertices taken from points along a boundary perimeter of the defined object and from the one or more ridge points.

29. The image processing method for converting two-dimensional images into three-dimensional images of claim 25, wherein the data processing step comprises:

defining triangles of the mesh pattern with vertices taken from points along an outline of the defined object and from points along the one or more path lines.

30. The image processing method for converting two-dimensional images into three-dimensional images of claim 25, wherein the data processing step comprises:

defining triangles of the mesh pattern such that the triangles obey one or more rules pertaining to distance minimization between vertices of the triangles.

31. The image processing method for converting two-dimensional images into three-dimensional images of claim 30, wherein the triangles are defined employing a recursive processing technique.

32. The image processing method for converting two-dimensional images into three-dimensional images of claim 30, wherein the triangles are defined employing an edge swapping technique.

33. The image processing method for converting two-dimensional images into three-dimensional images of claim 25, wherein the data processing step comprises:

defining triangles of the mesh pattern such that the triangles obey one or more rules pertaining to vertices of the triangles crossing contours.

34. The image processing method for converting two-dimensional images into three-dimensional images of claim 25, further comprising the step of:

processing the data associated with the mesh pattern employing an edge smoothing processing technique to further modify the triangles of the mesh pattern prior to the step of associating pixel depth values.

35. The image processing method for converting two-dimensional images into three-dimensional images of claim 34, wherein the edge smoothing processing technique further modifies the triangles such that two vertices of each triangle lie at the same depth level and the third vertex lies at an adjacent depth level.

36. The image processing method for converting two-dimensional images into three-dimensional images of claim 25, further comprising the step of:

processing the data associated with the mesh pattern employing a triangle refining processing technique to further modify the mesh pattern to accommodate one or more additional surface contours prior to the step of associating pixel depth values.

37. The image processing method for converting two-dimensional images into three-dimensional images of claim 36, wherein the triangle refining processing technique determines the one or more additional surface contours in response to a desired level of contour resolution.

38. The image processing method for converting two-dimensional images into three-dimensional images of claim 25, wherein the pixel depth values correspond to a surface shape that is applied to the mesh pattern.

39. The image processing method for converting two-dimensional images into three-dimensional images of claim 38, wherein the surface shape is three-dimensional.

40. The image processing method for converting two-dimensional images into three-dimensional images of claim 25, wherein the pixel depth values correspond to a desired amplitude of the mesh pattern.

41. An article of data storage media upon which is stored images, information or data created employing any of the methods or systems of claims 1–40.

42. A method for providing a three-dimensional image, comprising the steps of:

receiving or accessing data created employing any of the methods or systems of claims 1–40; and employing the data to reproduce a three-dimensional image.

* * * * *